(12) United States Patent
Gharib et al.

(10) Patent No.: US 10,892,843 B2
(45) Date of Patent: Jan. 12, 2021

(54) BROADCASTING IN A COMMUNICATIONS NETWORK

(71) Applicant: British Telecommunications Public Limited Company, London (GB)

(72) Inventors: Hamid Gharib, London (GB); Mohammad Zoualfaghari, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/493,233

(22) PCT Filed: Jan. 30, 2018

(86) PCT No.: PCT/EP2018/052272
§ 371 (c)(1),
(2) Date: Sep. 11, 2019

(87) PCT Pub. No.: WO2018/166693
PCT Pub. Date: Sep. 20, 2018

(65) Prior Publication Data
US 2020/0136740 A1    Apr. 30, 2020

(30) Foreign Application Priority Data

Mar. 16, 2017   (EP) .................................. 17161450

(51) Int. Cl.
*H04W 4/70*   (2018.01)
*H04J 13/10*   (2011.01)
(Continued)

(52) U.S. Cl.
CPC ........ *H04J 13/107* (2013.01); *H04B 1/70712* (2013.01); *H04J 13/004* (2013.01);
(Continued)

(58) Field of Classification Search
CPC .... H04J 13/004; H04J 13/18; H04B 1/70712; H04W 4/70
See application file for complete search history.

(56) References Cited

U.S. PATENT DOCUMENTS 6,480,525 B1 * 11/2002 Parsa .................... H04B 1/707
370/342
6,493,376 B1   12/2002 Harms
(Continued)

FOREIGN PATENT DOCUMENTS

CN    101442556    5/2009
CN    103298137    9/2013
(Continued)

OTHER PUBLICATIONS

International Search Report and Written Opinion—Application No. PCT/EP2018/052272, dated Apr. 20, 2018, 15 pages.
(Continued)

*Primary Examiner* — Fahmida S Chowdhury
(74) *Attorney, Agent, or Firm* — Patterson Thuente Pedersen, P.A.

(57) ABSTRACT

A spread spectrum system is used for transmitting data to devices in a distributed system. Each device has a respective spread spectrum code, and has a corresponding encoder in a central control system operating the same spread spectrum codes, the encoded data relating to the devices being aggregated over a shared channel. An additional broadcast spread spectrum coding sequence is allocated to a broadcast channel readable by a plurality of the devices using a command extraction function and used to transmit general commands for operation by the plurality of devices. Individual actuators may be arranged to respond in different ways to such a broadcast command, for example switching some on and switching others off. The broadcast may also be used to (Continued)

TS n: Time slot for sensor n to transmit its data
Gap: Gap at end of cycle before sensor 1 starts transmitting in next cycle change the coding sequences allocated to individual devices, allowing flexible use of the available spread-spectrum coding sequences.

2 Claims, 18 Drawing Sheets

(51) Int. Cl.
    *H04B 1/707* (2011.01)
    *H04J 13/00* (2011.01)
    *H04J 13/18* (2011.01)

(52) U.S. Cl.
    CPC .............. *H04J 13/18* (2013.01); *H04W 4/70* (2018.02); *H04B 2201/70707* (2013.01); *H04B 2201/70715* (2013.01)

(56) References Cited

U.S. PATENT DOCUMENTS

| | | | |
|---|---|---|---|
| 6,704,322 | B1 | 3/2004 | Niou |
| 7,230,974 | B1 | 6/2007 | Lu |
| 2002/0114307 | A1 | 8/2002 | Apneseth |
| 2006/0215611 | A1 | 9/2006 | Nakagawa |
| 2007/0021121 | A1 | 1/2007 | Lane |
| 2007/0081489 | A1* | 4/2007 | Anderson ............. H04W 16/14 370/329 |
| 2007/0258508 | A1* | 11/2007 | Werb ...................... H04L 9/083 375/140 |
| 2012/0120871 | A1 | 5/2012 | Jaeger |
| 2012/0136485 | A1 | 5/2012 | Weber |
| 2013/0223382 | A1* | 8/2013 | Abraham .......... H04W 72/1215 370/329 |
| 2014/0269272 | A1 | 9/2014 | Shuey |
| 2014/0348135 | A1* | 11/2014 | Ozluturk ............... H04L 1/0042 370/335 |
| 2015/0110033 | A1 | 4/2015 | Yi |
| 2015/0256220 | A1 | 9/2015 | Becze |
| 2015/0270867 | A1* | 9/2015 | Young ................. H04B 1/7085 375/145 |
| 2016/0066123 | A1 | 3/2016 | Ko |
| 2016/0218749 | A1 | 7/2016 | Levy |
| 2017/0208612 | A1 | 7/2017 | Tushar |

FOREIGN PATENT DOCUMENTS

| | | |
|---|---|---|
| CN | 105204358 | 12/2015 |
| DE | 199 33 813 | 2/2001 |
| EP | 0756395 | 1/1997 |
| EP | 2048637 | 4/2009 |
| GB | 2491431 | 5/2012 |
| JP | 2008109286 | 5/2008 |
| WO | WO2007012289 | 2/2007 |
| WO | WO 2015052613 | 4/2015 |
| WO | WO2016057193 | 4/2016 |
| WO | WO2016186456 | 11/2016 |
| WO | WO2018166694 | 9/2018 |
| WO | WO2018166695 | 9/2018 |

OTHER PUBLICATIONS

International Preliminary Report on Patentability, International Application No. PCT/EP2018/052277, dated Feb. 22, 2019, 7 pages.
International Preliminary Report on Patentability, International Application No. PCT/EP2018/052275, dated Jun. 12, 2019, 9 pages.
Kobatake N et al: "Multi-code SS-CSMA/CA for cluster-tree wireless ad hoc networks", Wireless Communication Systems, 2009. ISWCS 2009. 6$^{th}$ International Symposium on, IEEE, Piscathaway, NJ, USA, Sep. 7, 2009 (Sep. 7, 2009), pp. 652-656, XP031545230, ISBN: 978-1-4244-3584-5 paragraph [00II]; figure 1.
ElAttar et al, "Enhancing the Performance of Wireless Adhoc Networks Using Spreading Codes", "2014 Sixth International Conference on Computational Intelligence, Communication Systems and Networks (CICSyN). Proceedings", published 2014, IEEE Computer Society, pp. 176-181.
European Search Report—Application No. EP17161450, date of completion of search Aug. 22, 2017, 1 page.
European Search Report—Application No. EP17161446, date of completion of search Aug. 25, 2017, 1 page.
European Search Report—Application No. EP17161448, date of completion of search Sep. 22, 2017, 1 page.
GB Search Report—Application No. GB1704215.1, date of completion of search Sep. 18, 2017, 1 page.
GB Search Report—Application No. GB1704207.8, date of completion of search Sep. 18, 2017, 1 page.
GB Search Report—Application No. GB1704219.3, date of completion of search Sep. 26, 2017, 4 pages.
U.S. Appl. No. 16/493,229, filed Sep. 11, 2019, Inventors Hamid Gharib et al.

* cited by examiner

BROADCASTING IN A COMMUNICATIONS NETWORK

CROSS-REFERENCE TO RELATED APPLICATION

The present application is a National Phase entry of PCT Application No. PCT/EP2018/052272, filed Jan. 30, 2018, which claims priority from European Patent Application No. 17161450.6 filed Mar. 16, 2017, each of which is fully incorporated herein by reference.

TECHNICAL FIELD

This disclosure relates to data management systems, and in particular the handling of data generated by sensors and transmitted to a system management processor. Such data is increasingly used for interconnection, by way of the Internet, of computing devices embedded in everyday objects, enabling them to send and receive data—the so-called "Internet of Things" (IoT).

BACKGROUND

The Internet of Things has been defined as "the network of physical devices, vehicles, buildings and other items—with embedded sensors and actuators—and the network connectivity that enable these objects to collect and exchange data". One core requirement of IoT is the ability of the sensors to transmit the collected data to the remote systems responsible for processing and storing the data. At the same time, IoT control and management systems need to send instructions to actuators to operate equipment (such as turning a lamp on or off) and to the sensors, for example to change their configuration or update their software.

In general, most actuators also incorporate a sensor of some kind in order to report the operating state of the actuator to the elements that control it. Likewise, many sensors incorporate an actuator in order to be responsive to commands from a control center to deliver data on demand ("data pull") rather than operating autonomously, in response to an external stimulus, or according to an internal clock ("data push"). In this specification, unless the context requires a more specific meaning, the term "sensor" embraces actuators whether or not they incorporate, or are incorporated in, sensors.

Sensors and actuators in an IoT network are typically small, low cost units with minimal processing power, which make use of portable power sources such as batteries. Therefore, it is essential to use battery power efficiently to prolong the sensor's operational life span. This constrains both the volume and reach of the data that can be transmitted by a sensor. Ideally, the smallest amount of data with minimum effective reach should be transmitted.

Although some sensors and actuators have wired or fiber connections to the internet, many of them send and receive data using wireless media. The wireless interface normally provides a number of states such as (i) transmit/receive (transceiver) state, (ii) idle state, and (iii) sleep state. The maximum power usage occurs in the transmit/receive state and the minimum happens in the sleep state. In the idle mode, the wireless (radio frequency) interface is not communicating but its circuitry is still turned on, ready to detect transmissions from base stations or other sensors nearby. This means that the power usage in idle state is only slightly less than that in the transmit/receive state. In particular, in idle mode, all transmissions detected have to be analyzed by the sensor device before it can be determined whether they carry any data or instructions relevant to that sensor device. To minimize power usage, both the duration of transmit/receive and idle states should be minimized and that of the sleep state maximized. In the transmit/receive state, some sensors may be able to both send and receive data and management instructions simultaneously. This maximizes operational efficiency, but requires that the data sent and received are not mixed up. To achieve this, appropriate data encoding schemes and frequencies are required.

An important characteristic of wireless Internet of Things communication is that it is regulated by duty cycle. Duty cycle is the proportion of time during which a device is active. In the case of a sensor's radio component, given its three states as defined above, the duty cycle would be the time the radio component is in transmit/receive (transceiver) state. For example, a. duty cycle of 1% means that if a device operates for 1 mSec, it cannot then operate in the next 99 mSec. To achieve maximum efficiency, the length of duty cycle should be minimized. In many countries, the duty cycle has been restricted and regulated, to as little as 1%, in order to prevent interference and collision of data transmitted from different sensors/base stations, in the same area, at the same time and using the same frequency.

Time division duplex (TDD) is a transmission scheme that allows separate flows for uplink and downlink data transmission. Uplink is separated from downlink by the allocation of different time slots in the same frequency band. Some simple systems allocate time slots on the fly, but these are more suited to voice systems, as humans are able to recognize cues in each other's speech which inhibit them from talking over each other.

Spread-spectrum techniques are methods by which a signal (e.g. an electrical, electromagnetic, or acoustic signal) generated with a particular bandwidth is deliberately spread in the frequency domain, resulting in a signal with a wider bandwidth. These techniques are used for a variety of reasons, including the establishment of secure communications, increasing resistance to natural interference, noise and jamming, to prevent detection.

Code Division Multiple Access (CDMA) is an example of a multiple access method, in which several transmitters can send information simultaneously over a single communication channel. This allows several users (transmitters) to share a band of frequencies. To permit this without undue interference between the users, CDMA employs spread-spectrum technology and a special coding scheme where each transmitter is assigned a unique code. The transmitted signal can only be decoded by a receiver which is programmed with the same code. By making the codes used by each transmitter mutually orthogonal with each other, several transmitters can transmit information simultaneously using the same frequency band, and at the same time interval. The orthogonality between the codes prevents the transmitted codes from interfering with each other, so that each receiving system is able to detect the data sent by its respective transmitter even if multiple transmissions have been made and their data aggregated.

Spread-spectrum CDMA is generally less suitable for high-bandwidth digital communication such as streaming than it is for voice, because the human brain is better able to cope with discontinuity of signal (voice) than a digital system, which requires error correction software to handle any missing or modified data. Although IoT has an inherently lower requirement for bandwidth than most data communications, there would nevertheless be some practical difficulties in applying a standard CDMA system, optimized for voice, to an IoT system.

Normal CDMA practice is to make the maximum bandwidth available to all channels (hence "spread spectrum"). However, in most cases IoT applications, only one relatively narrow frequency band is available to be utilized in an IoT network.

TDD-CDMA is a system in which TDD is added on top of CDMA, uses two sets of time slots (duty cycles) for bi-directional communication. While normally CDMA shares the same frequency band in the same time for the different users, TDD-CDMA allocates different time slots for uplink and downlink, wherein both uplink and downlink are using the same CDMA technique, but in the different directions. This time division allows a single code to be used for each uplink/downlink pair, doubling the number of active users which can be accommodated in the system as the total number of codes in a code set is fixed. However, as noted above, separation of both TDD and CDMA uplink and downlink channels can be an inefficient use of bandwidth where traffic is typically asymmetric. The division of time between uplink and downlink also increases the length of duty cycles, as each end of the link is essentially idle (in receive-only mode) for half the time. There is also a need for synchronization.

In TDD-CDMA time is divided between transmission and reception, limiting the volume of data that can be transmitted as the active time or duty cycle has to be shared between transmission and reception. This also complicates the design of sensor/actuator transceivers, with higher power and process consumption, and they require to be always fully synchronized with the base station and also other nodes. The number of active users which can be accommodated in such a system would be half of a single-direction CDMA, as each node/transceiver can only operate in transmit mode or receive mode (not both) at any given time.

This can be inefficient, as typically traffic is asymmetric. For example more data is carried on uplinks (from sensors to central processors) than on the downlinks (from central processors to the actuators operating the sensors. In other applications, for example control an array of distributed actuators such as a streetlighting installation, there may be little or no activity in the uplink. However, each channel (up or down) is allocated the same bandwidth.

SUMMARY

Embodiments of this disclosure, together with those disclosed in Applicant's co-pending applications filed on the same date as this one and entitled Synchronization in a Communications Network and Branched Communications Network (claiming priority from European applications 17161446.4 and 17161448.0, respectively) seek to address some of these issues.

According to embodiments of the disclosure, there is provided a process for generating signals specific to a plurality of devices, for transmission by a control center to the devices, each signal including a spread spectrum coding sequence specific to the respective device convolved with a code specific to a command to be performed by an actuator associated with the device, for transmission over a multiple access channel carrying a plurality of such signals, each specific to a respective device, wherein commands relating to each device are capable of extraction by convolving the signal with the spread spectrum encoding sequence specific to the respective device, wherein a further broadcast spread spectrum coding sequence is allocated to a broadcast channel readable by a plurality of the devices and used to transmit general commands for operation by the plurality of devices, wherein the devices are configured to respond to the general commands by changing spread spectrum encoding sequences allocated to the devices for transmission and receiving data, and one or more devices of a first group respond to a set of general commands by switching between a first receive only mode, using a first spread spectrum sequence, a second transmit only mode using the same or a second spread spectrum sequence, full duplex mode using two spread spectrum sequences to transmit and receive simultaneously, and an idle mode in which the devices of the first group are responsive only to the broadcast spread spectrum encoding sequence, and wherein the same set of general commands causes a second group of devices to respond in a manner complementary to the responses of the first group, so that a set of spread spectrum sequences is allocated to the two groups in common, each sequence being used at any given time by only one or other of the two groups.

A control system for operating the process may comprise a plurality of encoders for signals to be transmitted to target devices, each encoder using a spread spectrum coding sequence allocated to a respective target device, to convolve with a code specific to a command to be performed by an actuator associated with the device, to generate commands specific to one or more of the target devices, and having a transmitter for transmitting signals over a multiple access channel carrying the convolved signals, further comprising a further encoder for broadcasting a spread spectrum encoding sequence allocated to a broadcast channel readable by a plurality of the devices and used to transmit general commands for operation by the plurality of devices, wherein the plurality of encoders are reconfigurable to change the allocations of spread spectrum encoding sequences to respective target devices, and the general commands are configured to cause the target devices to operate according to the changed allocations of spread spectrum encoding sequences, and in which the plurality of encoders comprise a first group capable of switching between a first transmit only mode, using a first spread spectrum sequence, a second receive only mode using the same or a second spread spectrum sequence, a full duplex mode using two spread spectrum sequences to transmit and receive simultaneously, and an idle mode, and wherein a second group of encoders operate in a manner complementary to the operational modes of the first group, so that a set of spread spectrum sequence is allocated to the two groups in common, each sequence being used at any given time by only one or other of the two groups.

A device for operating according to embodiments of the disclosure by detecting and decoding signals specific to the device from a spread spectrum signal may have a receiver for receiving a spread spectrum signal over a communications medium, a first spread spectrum element for convolving the spread spectrum signal with a code specific to the device to extract command data to cause a command to be performed by an actuator associated with the device, and a processor for decoding and processing the extracted data, having a second decoding element arranged to convolve the spread spectrum signal with a second code to receive commands for controlling the operation of the decoding process, having an encoding element for generating spread spectrum signals using a spread spectrum encoding process, and arranged to respond to a set of general commands by switching between a first receive only mode, using a first spread spectrum sequence, a second transmit only mode using the same or a second spread spectrum sequence, a full duplex mode using two spread spectrum sequences to transmit and receive simultaneously, and an idle mode in which the device is responsive only to the broadcast spread spectrum encoding sequence.

The same set of general commands may therefore be used to cause a two groups of devices to respond in a manner complementary to the each other, so that a set of spread spectrum sequences can be allocated to the two groups in common, each sequence being used at any given time by only one or other of the two groups. The general commands may include synchronization signals for controlling timing of the coding process.

The or each spread spectrum decoding element may be configured to convolve the incoming spread spectrum signal with the device-specific code over a plurality of overlapping time windows in order to identify a decoding sequence synchronized with the signal encoded in the incoming spread spectrum signal.

Using embodiments of the present disclosure, the efficiency of the system can be improved by allocating codes dynamically, either per request or predefined. This also allows for asymmetry between the volumes of data in up- and down-links, allowing more devices to operate with the same number of codes, simultaneously.

The use of CDMA allows all sensors/actuators to avoid the need for frequency or time division, in particular between upstream and downstream, therefore reducing the complexity of synchronization to avoid conflicts. This allows many more devices to utilize a single time slot (duty cycle) and have bi-directional communication in the same time slot. Use of a narrower frequency band also reduces the power consumption of the sensors.

Embodiments of the disclosure apply the CDMA technique to the data management platform, increasing the efficiency of the network. Embodiments also provide a number of other innovations.

In embodiments of the disclosure, Code Division Multiple Access (CDMA) is used for two-way communication in an IoT network between each sensor (or actuator) and the systems responsible for the processing of the data collected by the sensors, and for the management of the sensors and actuators.

BRIEF DESCRIPTION OF THE DRAWINGS

Embodiments of the disclosure will now be described, with reference to the drawings, in which.

DETAILED DESCRIPTION OF THE DRAWINGS

Figure 1:
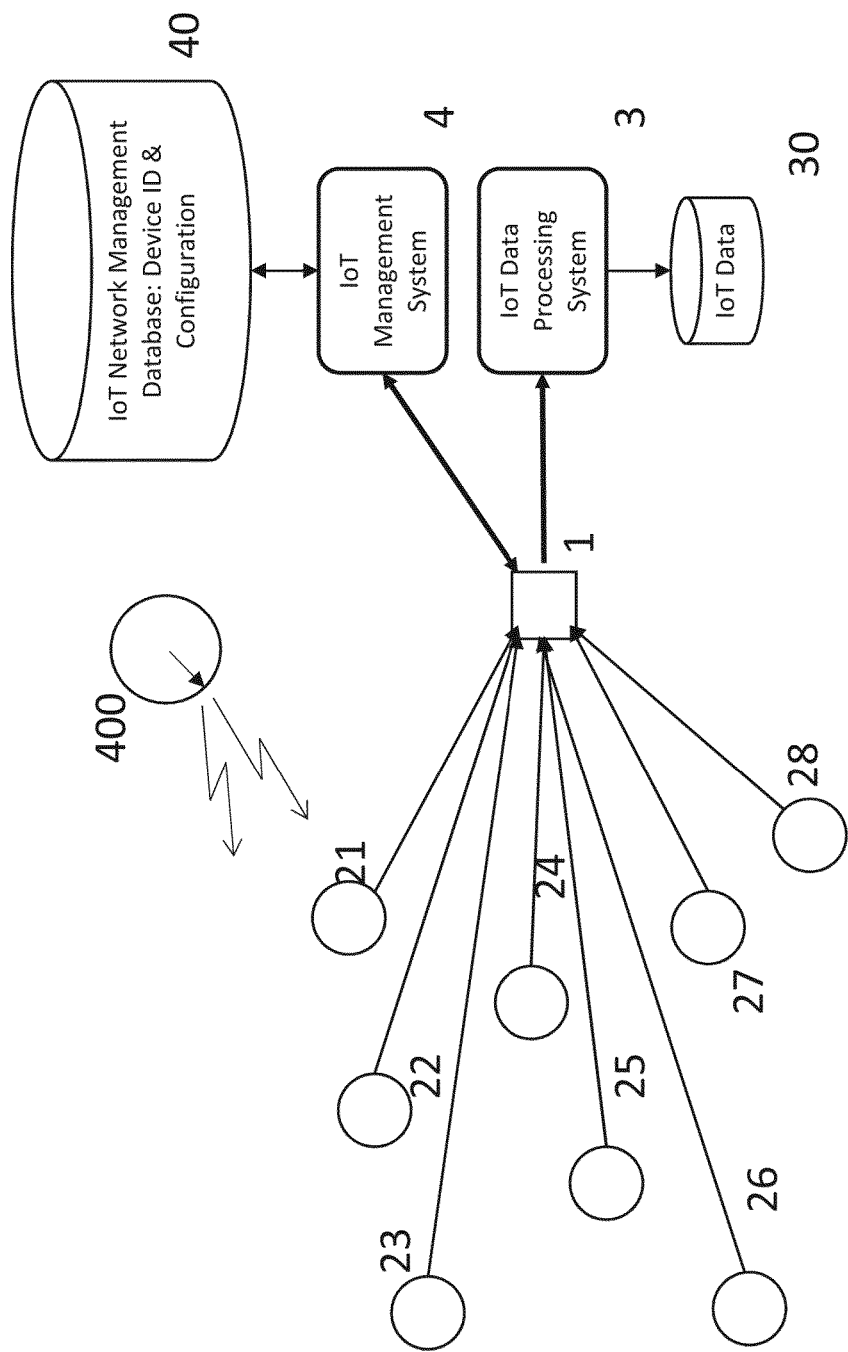
FIG. 1 is a schematic depiction of a first simplified network architecture.
Figure 2:
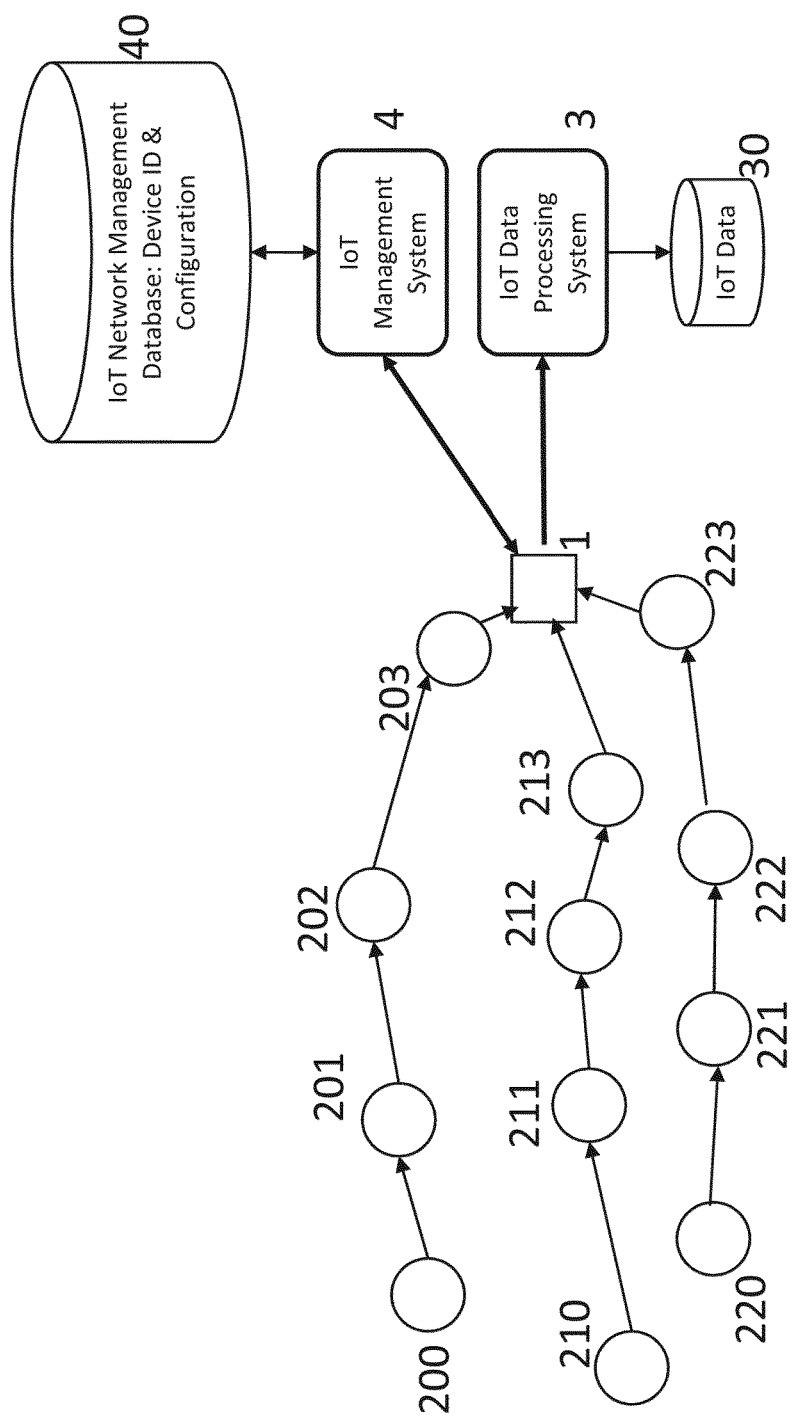
FIG. 2 is a schematic depiction of a second simplified network architecture.

FIGS. 1 and 2 depict two simplified network architectures, simplified for illustrative purposes. Due to the limited power of the batteries used by sensors, and because sensors usually operate in different frequency bands, use different protocols and have no internet connectivity the data that they transmit usually cannot directly reach the target data processing system. Instead, the sensor data is passed to an aggregator/gateway 1 for onward transmission to the target system. In both FIGS. 1 and 2 a gateway node 1 provides communication between a number of sensors 20-29 (FIG. 1), 200-223 (FIG. 2), and data processing and management systems 3, 4 having respective databases 30, 40. The sensors 20, 200, etc., transmit the data that they collect to the data processing systems 3 and receive control/management instructions from the management systems 4. As depicted in FIG. 1, the data may be sent between each sensor 20, 21, 22, etc., and the gateway 1 directly. However, if a sensor 200 is not close enough to the gateway 1, its data may be forwarded indirectly, through a number of neighboring sensors 201, 202, 203 (determined using a multi-hop routing algorithm) before it can reach the gateway, as depicted in FIG. 2.

Two way communication between sensors and target system normally involves the exchange of a large number of messages on a regular basis (e.g. every few seconds/minutes/hours/etc.). The number of exchanged messages and the size of the exchanged data depend on the sensor type and the requirements of the data processing and management systems.

Wireless transmission of sensor data presents a number of problems, in particular related to security and the avoidance of data collision.

Each sensor in the network is provided with the capability to transmit its data using CDMA technology, and embodiments of the disclosure can operate without the need for each sensor to have its own SIM card and network address. Using CDMA, each sensor can also communicate with other sensors in its vicinity or with a local gateway responsible for collecting the sensor messages, synchronizing and combining them and forwarding the resulting combined messages to the data processing or management systems.

The receiving system would be able to detect the data sent by each sensor even if multiple sensors have sent their data simultaneously and their data have been aggregated. For instance, assuming there are two sensors S1 and S2 which use the following codes (chip sequences) to encode and transmit their data:

| | | | | | | | | | |
|---|---|---|---|---|---|---|---|---|---|
| S1's chip sequence | 1 | 0 | 0 | 0 | 1 | 0 | 0 | 0 | 1 |
| S1's spreading sequence | 1 | −1 | −1 | −1 | 1 | −1 | −1 | −1 | 1 |
| Transmitted bits by S1 when data = 0 | −1 | 1 | 1 | 1 | −1 | 1 | 1 | 1 | −1 |
| Transmitted bits by S1 when data = 1 | 1 | −1 | −1 | −1 | 1 | −1 | −1 | −1 | 1 |
| S2's chip sequence | 1 | 0 | 0 | 0 | 0 | 1 | 0 | 0 | 1 |
| S2's spreading sequence | 1 | −1 | −1 | −1 | −1 | 1 | −1 | −1 | 1 |
| Transmitted bits by S2 when data = 0 | −1 | 1 | 1 | 1 | 1 | −1 | 1 | 1 | −1 |
| Transmitted bits by S2 when data = 1 | 1 | −1 | −1 | −1 | −1 | 1 | −1 | −1 | 1 |
| Aggregated signal if S1 and S2 simultaneously transmit data bit 1 | 2 | −2 | −2 | −2 | 0 | 0 | −2 | −2 | 2 |
| Aggregated signal if S1 transmits data bit 1 and S2 simultaneously transmits data bit 0 | 0 | 0 | 0 | 0 | 2 | −2 | 0 | 0 | 0 |

It will be noted that a value of minus 1 is used in the spreading sequence to represent zero in the chip sequence. This is because to allow a zero value to be distinguished from a null (i.e., no signal being transmitted).

The receiving system would have a copy of each sensor's spreading sequence. These codes are used by the receiving system to extract the data sent by each sensor (if any) from the received signal. This is done by convolving the spreading sequence with the aggregated signal (essentially multiplying the corresponding bits together and adding the results):

| | | | | | | | | | | Conv | Status | Recovered Bit |
|---|---|---|---|---|---|---|---|---|---|---|---|---|
| Aggregated signal if S1 and S2 simultaneously transmit data bit 1 | 2 | −2 | −2 | −2 | 0 | 0 | −2 | −2 | 2 | | | |
| S1's spreading sequence | 1 | −1 | −1 | −1 | 1 | −1 | −1 | −1 | 1 | | | |
| Recovered signal received from S1 | 2 | 2 | 2 | 2 | 0 | 0 | 2 | 2 | 2 | 14 | >0 | 1 |
| S2's spreading sequence | 1 | −1 | −1 | −1 | −1 | 1 | −1 | −1 | 1 | | | |
| | 2 | 2 | 2 | 2 | 0 | 0 | 2 | 2 | 2 | 14 | >0 | 1 |
| Aggregated signal if S1 transmits data bit 1 and S2 simultaneously transmits data bit 0 | 0 | 0 | 0 | 0 | 2 | −2 | 0 | 0 | 0 | | | |
| S1's spreading sequence | 1 | −1 | −1 | −1 | 1 | −1 | −1 | −1 | 1 | | | |
| Recovered signal received from S1 | 0 | 0 | 0 | 0 | 2 | 2 | 0 | 0 | 0 | 4 | >0 | 1 |
| S2's spreading sequence | 1 | −1 | −1 | −1 | −1 | 1 | −1 | −1 | 1 | | | |
| Recovered signal received from S2 | 0 | 0 | 0 | 0 | −2 | −2 | 0 | 0 | 0 | −4 | <0 | 0 |

Note that it is the sign (+ or −) of the recovered (convolved) data bits, not the amplitude, which identifies the recovered code. The amplitude is a measure of the reliability of the data bit The messages sent by each sensor can be encoded using a specific key allocated to that sensor. The messages sent by the sensors can be combined into a bulk message, and only the destination (data processing/management) system, which has a copy of each sensor's key, is able to extract each sensor's message from the combined message. This provides a high degree of security for the data transmitted by the sensors.

When dealing with a large number of sensors, especially when distributed over an area too large to allow direct communication (without relays) between the sensor and the data processing/management system, it is possible to aggregate the data transmitted by a subset of sensors using an aggregator unit (AU) before dispatching it to the final destination. This aggregation can be repeated at a number of levels by separate aggregator units. At each level, the data generated by the aggregators at the previous level are re-aggregated. This approach reduces the total volume of data transmitted by all sensors, resulting in faster communication between the sensors and the final system. Since the transmitted data is encoded by each aggregator, the overall level of security is enhanced.

Embodiments of the present disclosure allow sensors to transmit their data synchronously or asynchronously depending on the requirements of the sensor networks.

Using CDMA, a sensor is able to send data, and receive control instructions, in a single duty cycle, by using different spreading codes for uplink and downlink. This means that the sensors do not need to wait until the next duty cycle to receive or transmit data. This results in faster communication between the sensors and the data processing and management systems. However, the requirement for different spreading codes for uplink and downlink reduces the number of different sensors that can be used. An alternative is to use the same code alternately for uplink and downlink (time division duplex), but this reduces the amount of data each sensor can transmit or receive. It is also difficult to allocate time to the uplink and downlink efficiently, as uplink and downlink may require different volumes of data (and thus time for transmission) and unless one link operates only in response to a command from the other the time at which a transmission is required on one or other of the links is difficult to predict.

In an IoT sensor network, the data to be transmitted by each sensor can be encoded using a CDMA spreading sequence assigned to that sensor. The encoded data can then be transmitted to the local gateway (directly as shown in FIG. 1, or indirectly through other sensors as illustrated in FIG. 2).

To achieve maximum efficiency, the sensors can be synchronized. In this case, the transmission of their encoded data starts at the same time and the receiver at the gateway will detect an input which is the aggregate of the encoded data from the individual sensors. The gateway can transmit the aggregated code to the receiving system at pre-defined time intervals (e.g. every m minutes). This aggregation can increase the security of the data because it is now more difficult to distinguish between the data from different sensors without having their keys.

The ability to transmit the data from several sensors simultaneously, rather than sequentially, can speed up communication between the sensors and the control system by a factor proportional to the number of sensors, assuming the sensors are sending the same amount of data and have identical transmission capability. The amount of bandwidth saving that can be achieved by using CDMA is substantial. Considering a network of 625 sensors all sending their data to the same data collection system, the number of bits sent using CDMA technology would be 1/2000 of the non-CDMA situation resulting in faster transfer by a factor of 2000.

However, it is also possible to operate an unsynchronized CDMA system, using more complex codes. In contrast, in unsynchronized non-CDMA systems with random transmission times, collisions result in one of the data transmissions, and often both of them, being unintelligible.

By using CDMA it is also possible to achieve a more secure communication network between the sensors and the data management system. Taking as an example a configuration using synchronized sensors and synchronized transmission, in which each sensor encodes its data using a specific key (spreading sequence) allocated to it and all the data from various sensors are aggregated (but not interfered) at the beginning of each clock pulse. For example, if we have a 9 bit CDMA code sequence, then each transmitted data bit (0 or 1) will be spread into 9 bits (chip bits). In a synchronized system, data bits are transmitted at the beginning of each clock pulse. This means in each clock pulse, nine chip bits are transmitted from each sensor transmitting a data bit in that pulse. So, for example three sensors may be transmitting in the first clock pulse, and eight sensors may be transmitting in the second pulse (which may include some or all of the first three). The start of transmission should be exactly at the beginning of the clock pulse, so chip bits and data bits are aligned.

The data collection center has a copy of the key allocated to each sensor, and will therefore be able to decode the data transmitted by each sensor and identify which sensor transmitted it. Any eavesdropping systems may intercept the data from each sensor but they will not be able to decode it because they do not have the relevant key. Even if an eavesdropper were to happen to select a key that decodes some of the data, the data is of limited use without knowledge of the identity of the sensor to which that key is allocated.

For instance, we can reconsider a case where the data from sensors 51 and 51 are aggregated:

| Transmitted bits by S1 when data = 1 | 1 | −1 | −1 | 1 | −1 | −1 | −1 | −1 | 1 |
|---|---|---|---|---|---|---|---|---|---|
| Transmitted bits by S2 when data = 1 | 1 | −1 | −1 | −1 | −1 | 1 | −1 | −1 | 1 |
| Aggregated signal if S1 and S2 simultaneously transmit data bit 1 | 2 | −2 | −2 | 0 | −2 | 0 | −2 | −2 | 2 |

Without having the relevant keys it would be more difficult to extract the data sent by each sensor from the aggregated code. Also if any noise occurs, and as a result one chip bit is (or only a few chip bits are) altered, the data is still recoverable.

In embodiments of the disclosure, efficient duplex communication can be achieved within the limited duty cycle of IoT networks. Sensors, like many other devices, tend to operate intermittently, that is, they are normally active only for a small fraction of the time and then become inactive to save energy. The active-inactive cycle is repeated continuously. Normally, the radio component of a sensor is capable of both sending and receiving data at the same time (i.e. transceiving), and by extension, in the same duty cycle. Under normal circumstances, if a sensor needs to send data to a TS and at the same time that TS intends to send instructions to the sensor, then the sensor sends its data in one duty cycle and receives the instructions in the next one. It would be faster and more efficient in terms of both power usage and response times if both actions can be performed in the same duty cycle. This can be achieved by using the same code to encode both the data to be sent by the sensor and also the instructions to be received by it, without the risk of interference between them should they occur in the same duty cycle.

The transmission of data by the sensor and instruction by the TS can be synchronized with a pre-set internal clock aligned with other sensors, by using two distinct encoding keys (spreading sequences). One key is used by the sensor to encode its data before it is sent to the TS. The other key is used by the TS to encode its data/instruction before it is sent to the sensor. The key allocated to each sensor for encoding its outgoing data should be distinct from any key allocated to any other sensor, and likewise TS uses a different key for transmissions intended for each sensor. The sensor knows the key used by the TS for encoding data intended for that sensor, and the TS knows the key used by each sensor for encoding the data that sensor transmits. Note that the data sent to and from a sensor in the same duty-cycle may interact additively with each other at the receiver and be aggregated. However, as the sensor knows the key used by the TS to encode the data sent to it, so the sensor is able to extract the data destined for it from the aggregated signal. The same applies to data received at the TS from the sensors.

Based on the nature of CDMA, this technology can support both synchronous and asynchronous communications; however, different code sets, apparatuses and protocols may apply in each case. According to the nature of dumb sensors and basic end nodes of IoT entities, a simplified version of CDMA can be applied on the IoT network infrastructures, in the lower levels. A synchronous system can be achieved by synchronizing the end node entities (ENE) in an IoT network using various techniques, such as GPS timing from GPS units attached to each ENE, pre-set timing and clocking circuits or, in the case of ENEs connected to the Internet, an internet clock.

An asynchronous system can be provided by using codes with longer length and less code weight (number of ones), and by using forward error correction techniques (FEC), and interference cancellation units. In an embodiment to be discussed, a clock train is broadcast to all the ENEs using the existing CDMA network.

Figure 3:
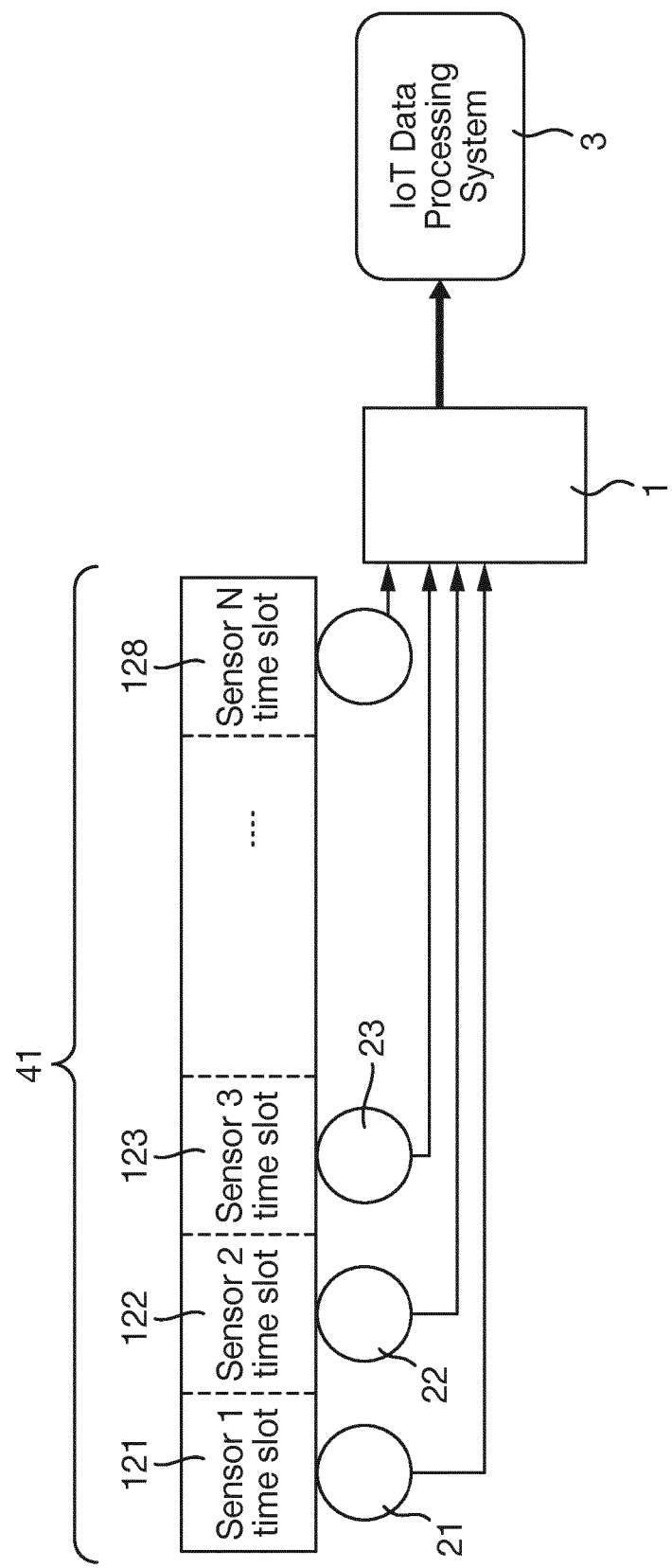
FIG. 3 is a schematic depiction of the generation of a time division system.

If multiple sensors transmit their data wirelessly without synchronization (i.e. there is overlap between the time windows during which they transmit their data) then there is the possibility of collision between their transmitted data before it reaches the gateway. This could result in data corruption. This collision problem can be avoided if the sensors are synchronized and each is allocated a separate time slot for data transmission, or it can be avoided by using an asynchronous CDMA system in which the decoding systems attempt decoding incoming signals at multiple starting points until a match is found. As depicted in FIG. 3, each sensor 21, 22, 23 (or 201, 202, 203, using the architecture of FIG. 2) is allocated a respective time slot 121, 122, 123, and transmits its data to the gateway 1 (or the next hop) during its allocated time slot. The gateway, on receiving the data, transmits it to the data processing system 3. However, this approach suffers from a number of problems.

Firstly, in the absence of a scheme for aggregating the sensors' data by the gateway, the gateway will transmit each sensor's data in full before transmitting the data from the next sensor, as shown in FIG. 3. This means that the total time required for transmitting data from all sensors will be linearly proportional to the number of sensors.

Figure 4:
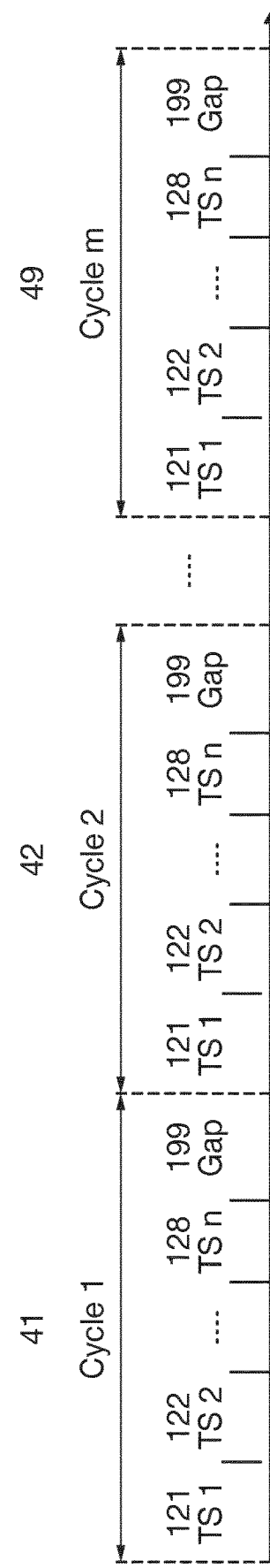
FIG. 4 is a schematic depiction of a time division multiplex.

Secondly, the volume of data (bandwidth required) to be transmitted from a gateway is equal to the sum of the volume of data transmitted by each sensor: For example, if all sensors transmitted the same amount of data d, the amount of data transmitted by n sensors will be n*d. This results in an upper limit on the number of sensors: if one considers a network of n sensors, in which each one transmits its data cyclically in its own time slot, the first sensor, having transmitted a set of data, cannot resume transmission until the last sensor has finished transmission of its data. One such cycle 41 of data transmission is illustrated in FIG. 3. FIG. 4 illustrates a sequence of such cycles 41, 42 . . . 49, each repeating the same pattern. In practice an inter-cycle gap 199 may be present if the number of sensors is less than the maximum capacity of the system, but this inter-cycle gap will get shortened as the number of sensors increases, reducing to zero at a point at which no more sensors can be added.

Thirdly, it is necessary to synchronize the sensors' transmissions. The sensors can be synchronized by being provided with timing signals using a central clock, which can reside, for example, in the gateway 1, with its timing signals transmitted to the sensors 20, 200, etc. Such a clock pulse generator or "drum clock" is depicted in FIGS. 1 and 2

However, this requires greater power usage by the sensors, because they would have to receive and process timing signals. The sensors' operations would also become more complex because of the need to receive and process timing signals. Alternatively, each sensor could be equipped with its own clock, which is periodically synchronized by a master clock which may reside, for example, in the gateway. This does not reduce the complexity of the sensor, but may reduce the power requirements. However, synchronization will, in general, be less accurate between synchronization events, requiring longer buffer or guard periods.

Fourthly, the data transmitted wirelessly by the sensors or the gateways can be intercepted by a third party, compromising its security and integrity unless it is encrypted or encoded in some way.

The message from/to each sensor needs to carry at least two types of information: namely the identification of the sensor, and the data captured by the sensor for transmission, or the data that is being sent to the sensor for its control/management. In the embodiments of the disclosure a separate sensor ID is not needed, as the spreading code is unique to the sensor to which it relates. This reduces the message size and increase the security, as each sensor can only comprehend the code/language allocated to it, so there would is no need for a separate code identifying the target sensor in a message because only one sensor understands the message. Even if an eavesdropper were to apply a spreading code to the message and decode it, without knowledge of the sensor or actuator to which the message relates the information would be of little value.

Figure 5:
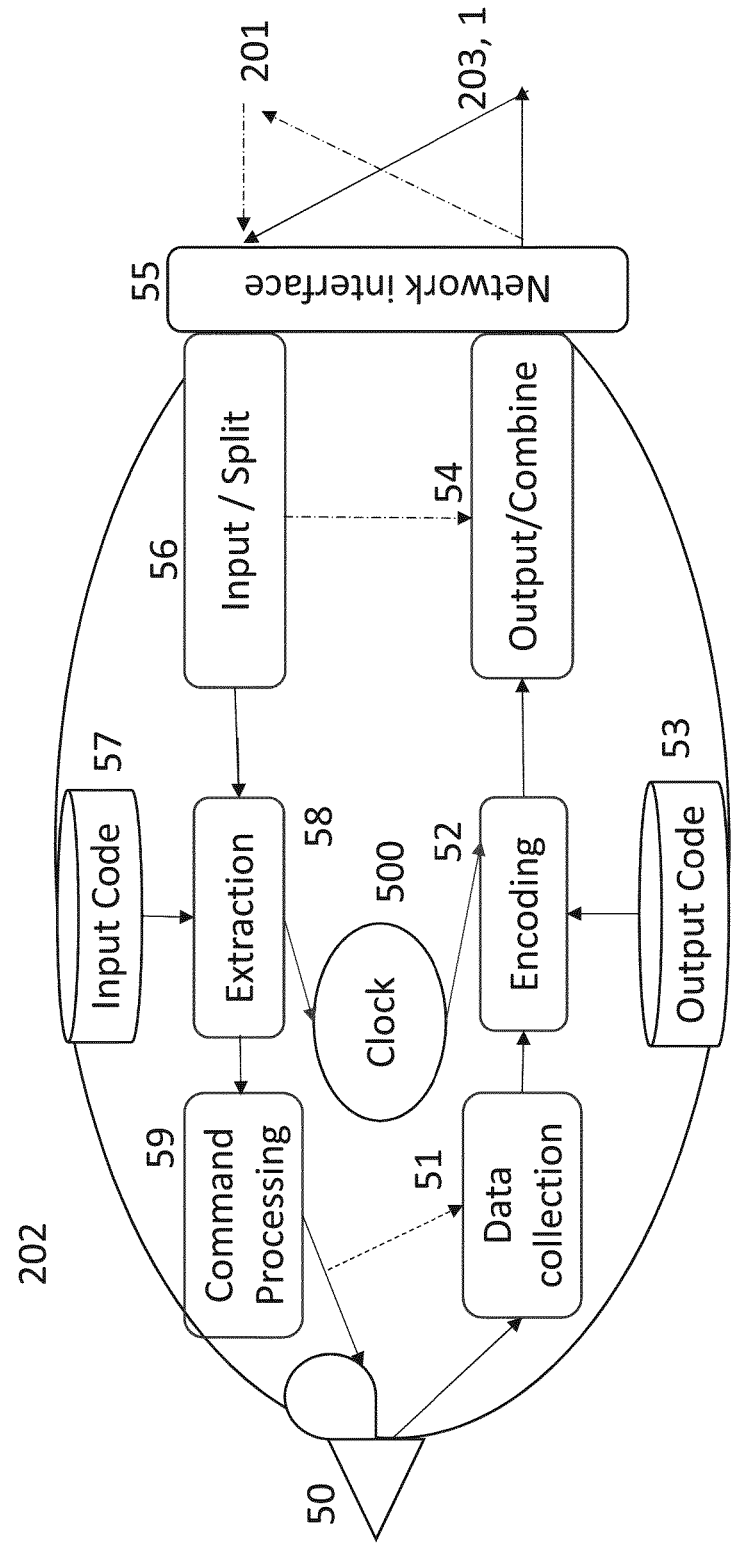
FIG. 5 is a schematic depiction of a sensor/actuator device.

FIG. 5 is a representation of a sensor node configured to operate according to an embodiment of the disclosure. For the sake of illustration, the node will be described as operating as node 202 in the network illustrated in FIG. 2, but it will be understood that all nodes in the network of FIG. 1 or FIG. 2 would operate in substantially the same way. The sensor node comprises a sensor 50 which detects properties in the environment of the node 202 and collects data in a data collection function 51. The data may be transmitted to a data processing system 3 by way of the gateway 1 (and any intermediate nodes 203) in real time, or it may be stored for transmission in response to a command received from the data management system 4 by way of the gateway 1 and any intermediate nodes 203 through which the data is relayed. When the data is to be transmitted, it is encoded by an encoding function 52 using a CDMA code stored in the node (store 53) and the encoded data is passed to an output 54 for transmission to the gateway 1 by way of a network interface 55, which may use any suitable transmission system, for example radio, or an optical network.

Code Division Multiple Access (CDMA) is used for two-way communication between each sensor (or actuator) 20, 21 . . . 200, 201, . . . , etc., and the systems 3, 4 responsible for the processing of the data collected by the sensors, and for the management of the sensors and actuators themselves. Each sensor in the network is provided with a capability to transmit its data using CDMA technology, and embodiments of the disclosure can operate without the need for each sensor to have its own network address. Using CDMA, each sensor can also communicate with other sensors in its vicinity or with a local gateway responsible for collecting the sensor messages, synchronizing and combining them and forwarding the resulting combined messages to the data processing or management systems.

Each sensor is allocated a unique key 53, allocated to that sensor, which it uses to encode all the messages it sends to the data processing system 3.

The messages sent by the sensors can be combined into a bulk message, and only the destination (data processing/management) system 3, 4, which has a copy of each sensor's key, is able to extract each sensor's message from the combined message. This provides a high degree of security for the data transmitted by the sensors. Likewise, only the data processing/management) system 3,4 has access to the keys used for transmission of instructions to the sensors, preventing their misuse by rogue inputs from unauthorized users.

Commands transmitted to the node 202, either to download previously-stored data (51), to control a sensor 50 to take a reading, or to operate machinery associated with the node, are received from the gateway 1 over the network interface 55 (again via one or more intermediate nodes if no direct connection is available) for delivery to an input 56. It should be noted that, as a CDMA signal, the input is a combined signal of all inputs and outputs carried on the system. An input code (stored at 57) is used by an extraction unit 58 to extract the command data from the input signal that is to be used by the node 23. This data is used by a command processor 59 to control the sensor/actuator 50 and, if required, to cause the data collection unit 51 to deliver stored data to the output 54.

As will be discussed, the IoT management and data processing systems 3, 4 maintain a store of the relevant keys 53, 57, by which they can encode and decode messages to and from each sensor, as will be discussed.

If the node 202 is in use as a relay, the receiver 56 at the network interface 55 receives two or more CDMA signals from upstream and downstream nodes (201, 203). Each of these signals will consist of a combined set of data and/or commands, each encoded with its own unique codes. Those received from upstream will be a combination of any data generated by the upstream nodes (200, 201 in this example) whilst data received from downstream will be all commands intended for any of the nodes in the network, whether upstream or downstream, as well as any data generated downstream through the gateway 1 or at any intermediate node 203). This is because the interface has a single transmitter and receiver, and does not need to distinguish between upstream and downstream transmissions. The upstream and downstream inputs are both is fed to the output 54 as well as to the extraction unit 58. At the output unit 54 the encoded data from the encoder 52 is combined with the signal received at the input 56 for onward transmission to the neighboring nodes 201, 203 and thus to the rest of the network, e.g. 200 and the gateway 1. It will be understood that each node 1, 200, 201, 202, 203 receives all the data intended for, and transmitted by all the other nodes, whether notionally upstream or downstream, but commands generated by the management system 4 can only be acted on the node having the corresponding input code, and only the data processing system 3 can act on the data generated by the nodes. Thus the sensors/actuators are co-operating in a full duplex operation.

In embodiments of the present disclosure, one code sequence C0 from the code set is allocated to be used as a "broadcast command code". Each transceiver is programmed to decode this sequence as well as any sequence allocated specifically to that transceiver.

Figure 8:
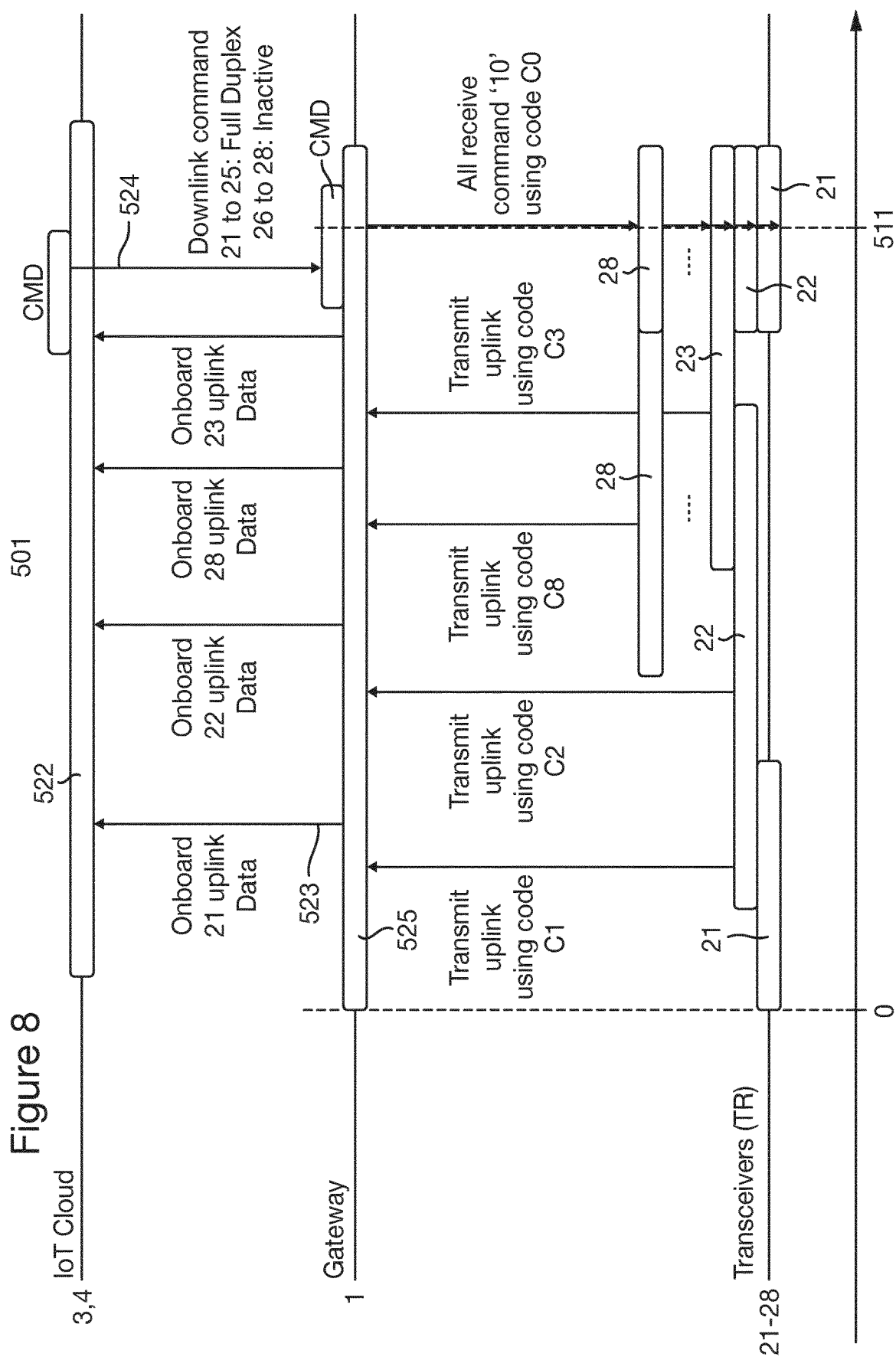
FIGS. 8, 9 and 10 are flow diagrams depicting information flows in an embodiment of the disclosure.
Figure 9:
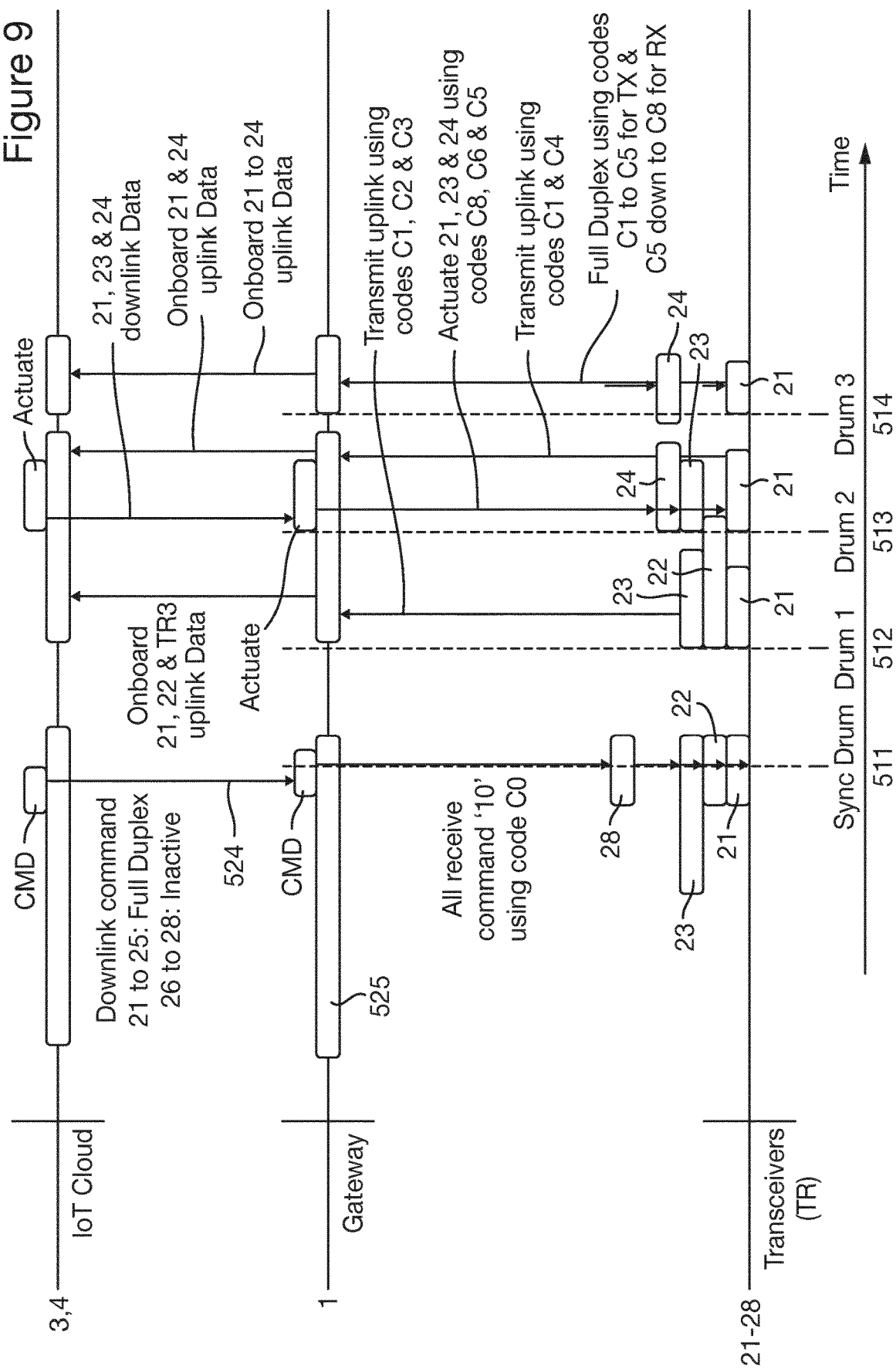
Figure 10:
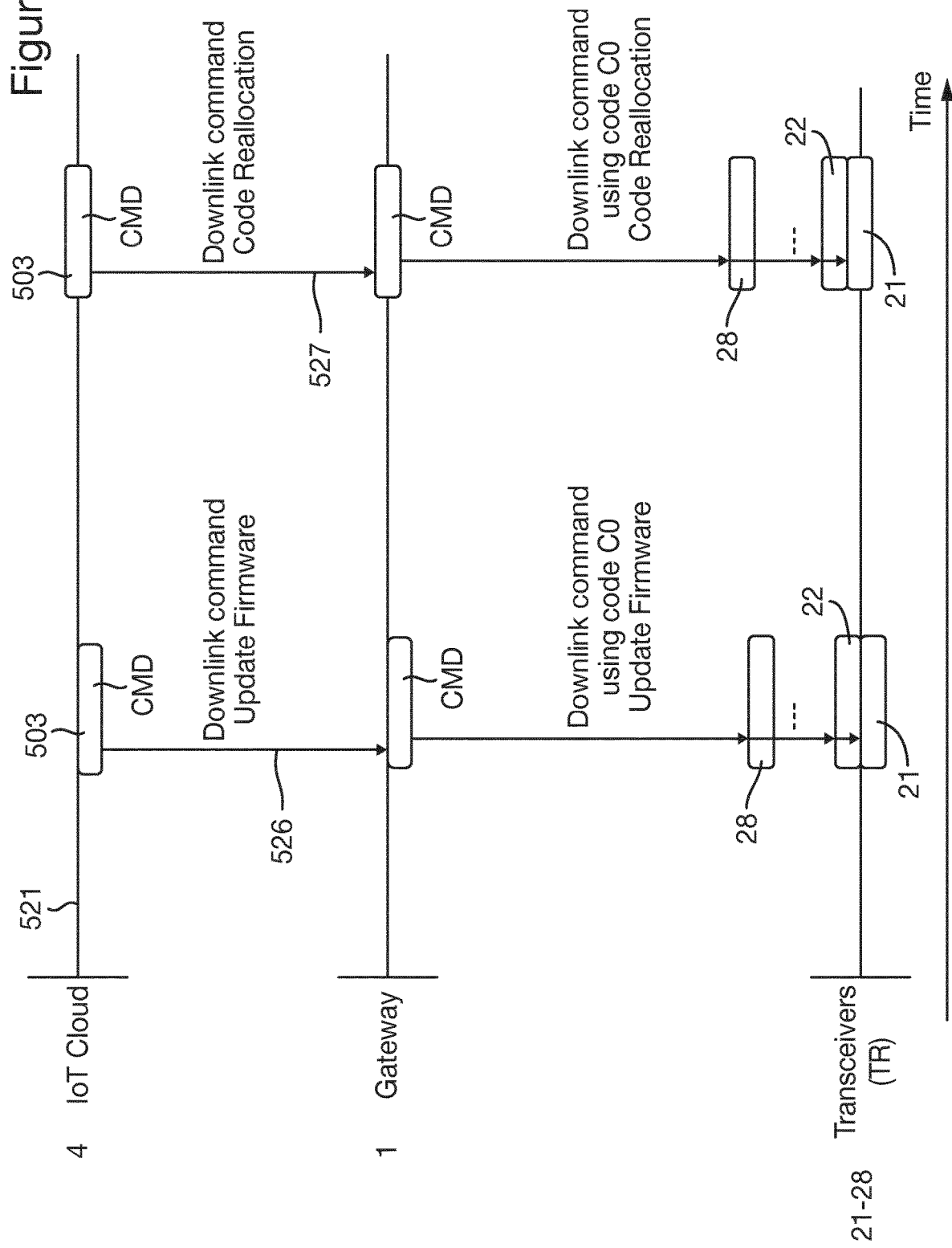

It would be possible to allocate more than one code sequence for use as broadcast codes, for example for subsets of the full set of transceivers The code sequence can be used for a number of purposes, some of which are exemplified in FIGS. 8, 9 and 10.

FIG. 8 depicts a process for broadcasting a command to all or a subset of the transceivers.

FIG. 9 depicts a process for sending a synchronization pulse (clock drum bit) to all/subset of transceivers FIG. 10 depicts a process for broadcasting a firmware update to all/subset of transceivers, and a process for performing a "Code Reallocation" to all or a subset of transceivers.

In this embodiment, the transceivers are (factory) pre-set with a code C0 for decoding broadcast commands. The control center has a one-to-many broadcast capability, and all the receivers can receive and understand the (same) message, decoding it using code C0.

Figure 6:
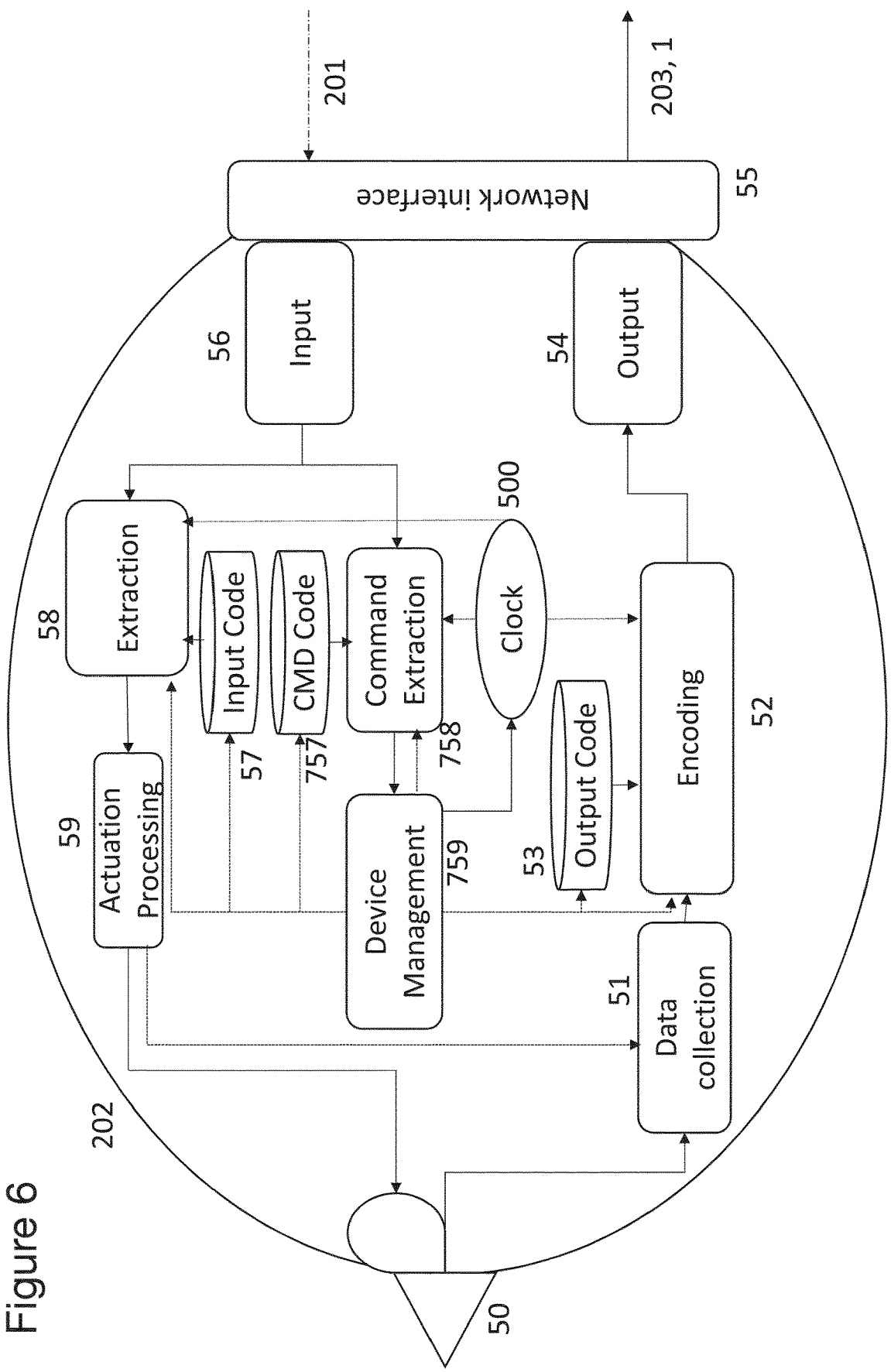
FIG. 6 is a schematic depiction of a variant sensor/actuator device according to an embodiment of the disclosure.

FIG. 6 illustrates the high level logical architecture of such a design. Features common with the simpler embodiment of FIG. 5 carry the same reference numerals. The additional elements are a command code store 757, a command extraction unit 758, and a device management unit 759. The command extraction unit decodes inputs received at the network interface 55, 56 using the c0 command code stored in the CMD code store 758, and forwards the commands to control the device management system 759. The device management system is configured to change settings of various other components 500, 51, 52, 53, 57, 757, 58, 758, 59, of the transceiver, in particular to synchronize the clock 500, to select input and output codes to be stored in the stores 57, 58, 757, 758 (including changes to the command code itself) and to modify duty cycles to be operated by the extraction and encoding processors 52, 58, 758. The command extraction unit 758 monitors the input 56 for a command sent via C0, and feeds the results into the device management unit 759. This device management unit is responsible for channel allocation, switching between input-only, output only, duplex, and idle modes, and firmware upgrades, and also controls the internal clock.

FIGS. 8, 9 and 10 show sequence diagrams for these various processes.

These figures depict a three-level architecture comprising the "IoT Cloud 4 "Gateway" 1 and "Transceivers" (21-29).

Referring first to FIG. 8, 522 is an activity which has a start-time, an end-time and length in the IoT Cloud level 3, 4, and 525 is an activity at the level of the gateway 1. Interactions between these activities are depicted generally at 523.

Generally each transceiver 21, 22, 23, ... 29 transmits data to the gateway 1 using its respective code C1, C2, C3 ... C9, and the gateway 1 forwards this data to the data processing system 3. As shown initially these transmissions are not synchronized.

The interaction 523 starts from the start-time of activity 525 and is completed at the end time of the activity 525. This interaction causes the generation of activity 522 in the IoT Cloud level (4). All the interactions (e.g. 523, 524, etc) between any two activities (e.g. 525 and 522) occur in parallel and start at the start-time of source activity (525) and are completed at the end time of the destination activity (522).

As shown in FIGS. 9 and 10, a command 524, 526, 527 may be transmitted from the IoT management system 4 using code C0, which is received and decoded by all the transceivers 21-29. This command may be used as a synchronization signal 524 in order to synchronize the transmissions of the transceivers 21-29. As can be seen, in response to the synchronization signal 524, each transceiver 21-28 is able to synchronize its activity cycles 512, 513, 514 with the drum signal 511. It will be noted that not all transmitters need to transmit on each cycle. The receivers all are synchronized to decode using the same synchronization for their spreading code, but not all of them will detect a message on each cycle.

It will also be noted that different code sets C1-C4, C5-C8 are used for the uplink and downlink. As will be discussed below, these allocations may be changed using another command signal.

The command code may be used to instruct the various transceivers 21-28 to operate on specified codes, and to change those allocations as circumstances require. In particular, individual transceivers may be instructed to operate in time division duplex mode (using the same code for uplink and downlink) or uplink only mode, or downlink only mode, instead of in full duplex mode (that is, with separate codes used for uplink and downlink), thereby releasing a code for allocation to another transceiver.

A simplified illustrative example will now be discussed. In this simplified example, a prime code family is used with p=3 and cardinality (N) of 9 code sequences (i.e. C0-C8) in a code set. In a full-duplex application, only four transceivers (TR) can be accommodated, each having two codes, one for transmit and another for receive. (The ninth code, C0, is the command code). For example, in the transceiver 21, C1 is allocated for transmit (TX) and C8 for receive (RX), and likewise for the other transceivers, for transceiver 2k, code Ck is allocated for transmit and code C(9-k) for receive.

| TRs | TX | RX |
|---|---|---|
| TR 21 | C1 | C8 |
| TR 22 | C2 | C7 |
| TR 23 | C3 | C6 |
| TR 24 | C4 | C5 |

A similar number of devices 25-28 can be defined as "shadow" devices. These can be allocated the same channels, but with their transmission and receive code allocations reversed:

| TRs | TX | RX |
|---|---|---|
| TR 25 | C5 | C4 |
| TR 26 | C6 | C3 |
| TR 27 | C7 | C2 |
| TR 28 | C8 | C1 |

Each shadow device shadows an original device and uses the same codes for TX and RX as the original device but in reverse order:

| Original TRs | Shadow TRs |
|---|---|
| TR 21 (C1, C8) | TR 28 (C8, C1) |
| TR 22 (C2, C7) | TR 27 (C7, C2) |
| TR 23 (C3, C6) | TR 26 (C6, C3) |
| TR 24 (C4, C5) | TR 25 (C5, C4) |

A command can then be defined to configure the eight transceivers into any one of a number of compatible configurations, as required to meet the demands being placed on the system. One example, using two binary digits to control all eight transceivers, is illustrated in the table below. Each of these states use each code for only one purpose, but the system can be configured such that all transceivers can operate in receive mode, or all of them in transmit mode, or half of them in full duplex mode.

| Binary Command | TR 21-24 | Shadow TR25-28 |
|---|---|---|
| 00 | RX Only | RX Only |
| 01 | Inactive | Full-Duplex |
| 10 | Full-Duplex | Inactive |
| 11 | TX Only | TX Only |

Any of the four commands (00, 01, 10, 11) can be sent over channel C0 to all transceivers, and acted on by them. For instance, by sending 00 to them all eight transceivers will operate in RX mode. If the code 01 is sent to them, then the original transceivers will become inactive and the shadow ones will operate in full-duplex mode. Code 10 has the reverse effect. Finally, code 11 will put all transceivers into transmit mode.

More complex instructions are of course possible. The trigger for a change of mode may come from the IoT management system 4, or may be in response to a request from transceiver for permission to operate in a particular mode (e.g. full-duplex). Upon receiving this request, the gateway 1 decides to allow the transceiver to operate in the requested mode immediately or at some point of time in future, and generates a set of commands for broadcast to a subset of transceivers to make them operate in a new fashion. For example, adding the requested transceiver to a full-duplex group of transceivers.

The allocation of codes to Transceivers and Shadows, the number and meaning of the commands and the number of device groups (in this case TWO[[;]], the TR group and the Shadows group) can vary and be different from this example. For example, it is possible to have four groups of devices, and a set of commands to achieve the following:

Transceivers in group 1: always operate in full-duplex mode
Transceivers in group 2: always operate in transmit mode
Transceivers in groups 3 and 4 act as original and shadow transceivers and will be in one of the two modes: full-duplex or inactive.

FIG. 8 illustrates a case where all the devices have a mono dialogue (i.e. all TX) to the gateway (i.e. CMD=11 from table above), and they operate asynchronously. Code C0 can be safely used to send a new mode (i.e. CMD=10) to the device (524), while at the same time some or all of these devices are transmitting.

FIG. 9 illustrates a case in which all the devices get a clock command 524 sent from gateway using C0, and start an internal clock (pulse train). From this point onwards, they can send/receive their messages aligned with others, (synchronous CDMA). In this example an actuation signal 526 is then transmitted causing the primary transceivers 21-24 to operate in full-duplex mode, using all eight codes C1 to C8 while the Shadow transceivers 25-28 are inactive. A further actuation code may then be used to change these code allocations.

FIG. 10 illustrates a firmware update 503 and a code reallocation 504, respectively, both using the command channel C0.

Figure 7:
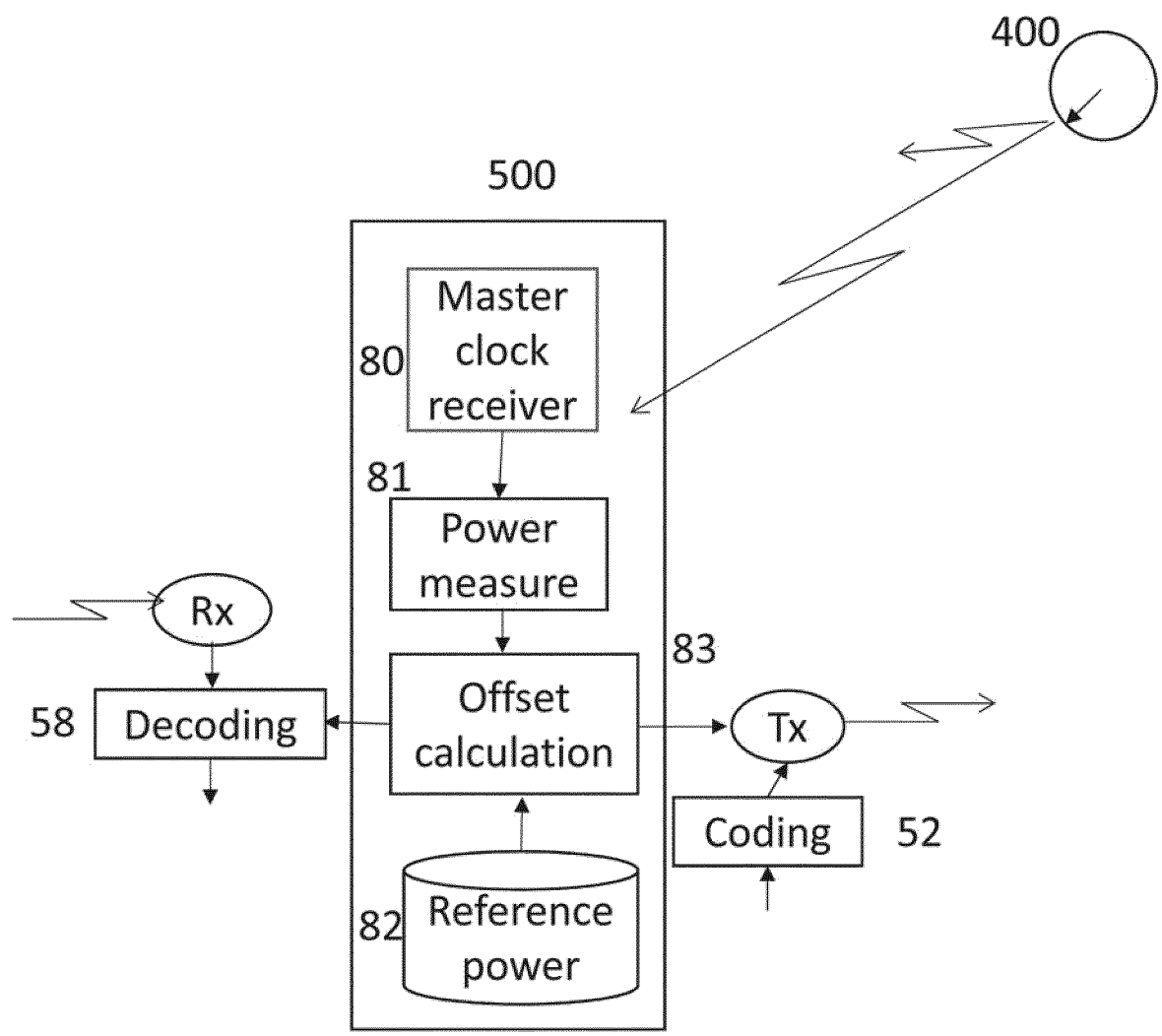
FIG. 7 is a schematic illustration of the functional elements of a synchronization subsystem of the embodiments of FIG. 5 or FIG. 6.

Also shown in FIG. 5 is a synchronizing system 500, shown in more detail in FIG. 7. As shown in FIG. 7 a pulse train of a clock drum is broadcast either by a wireless antenna or, in one embodiment, in a general control transmission using one of the CDMA sequences. The clock signal is detected in the synchronizing system 500 by a receiver 80, and used to control the encoding and decoding processors 52, 58. The synchronization can be improved further, by determining the distance of each transceiver from the broadcasting antenna, using techniques such as measuring the received signal power, using a signal strength monitor 81, and comparing it with a reference value either stored locally (82) or encoded in the broadcast clock signal 400 to control an offset calculation 83.

This clocking system reduces symbol collisions, and interference, and allows more throughput as less complex code sets are required. This in turn allows a greater number of simultaneous active transceivers, less bit error rate (BER) and hence less need for complicated forward error correction units (FEC), easier detection at receivers and hence simpler and faster receivers.

An asynchronous system can be used if perfect orthogonal codes, with zero correlation (i.e. similarity) are used. The receiver puts a window of code length (L) on the received sequence and repeats this for each received bit, following with (L−1) previous bits, and correlates the code signature with this window to find the similarity, and recover the data. This requires more processing than a synchronous system, as each window has to be assessed to determine whether the signal carries a message. However, once the correct window has been identified the sensor or receiver can lock on to that window, at least for the duration of that message.

Figure 11:
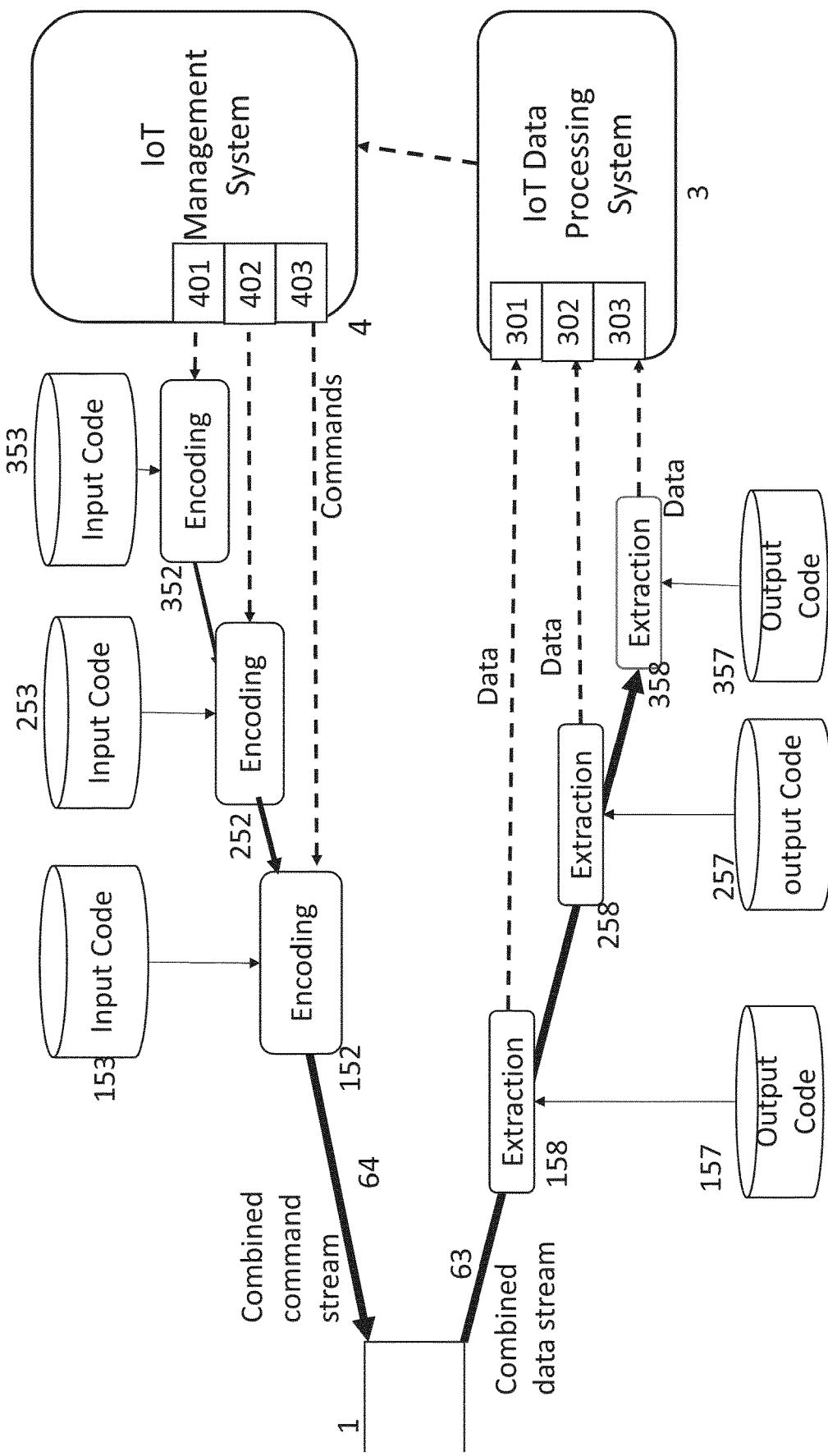
FIG. 11 is a schematic depiction of a processing/management system operable according to an embodiment of the disclosure.

FIG. 11 is a representation of a data processing system 3 and a management system 4 configured to operate according to one level of a hierarchy in an embodiment of the disclosure. Data received and processed by the data processing system 3 is used to control the management system 4. The data processing system may also send instructions to the management system to cause individual sensors to collect data.

As depicted in FIG. 11, both the data processing system 3 and the management system 4 are connected to the sensors through the same gateway 1, but more complex network structures are possible, with multiple gateways, provided that all messages can be transmitted to all destinations.

The data processing system has respective interfaces 301, 302, 303 etc., serving each sensor node 201, 202, 203. An input stream 63 from the gateway 1 carrying all the encoded data collected from the sensors 200, 201, ... 210, ... , etc., is processed by a bank of extraction decoders 158, 258, 358 ... , each using a respective input code 157, 257, 357 corresponding to the output codes 53 used by the respective encoders 52 in each node. It should be noted that the data stream 63 is not modified by the extraction decoders 158, 258, 358, ... , as each decoder extracts the data required from the same stream. Although depicted as taking place in series, the extraction may take place from parallel feeds. The extracted data is fed by each decoder to its respective interface 301, 302, 303 ... .

The data processing system also has respective interfaces 401, 402, 403, etc., serving each sensor node 201, 202, 203. These all supply command data to the gateway 1 through a combined command stream 64, carrying all the encoded data destined for the sensors 200, 201, ... 210, ... , etc. The command data from the interfaces 401, 402, 403, is processed by a bank of encoders 152, 252, 352 ... , each using a respective output code 157, 257, 357 corresponding to the input codes 57 used by the respective extraction decoders 58 in each node 201, 202, 203. It should be noted that each encoder 152, 252, 352 modifies the data stream 64 by adding its own encoded data. Although depicted as taking place in series, the encoding may take place on several branches, combined before delivery to the gateway 1.

The system described above has a number of practical applications and refinements.

Figure 12:
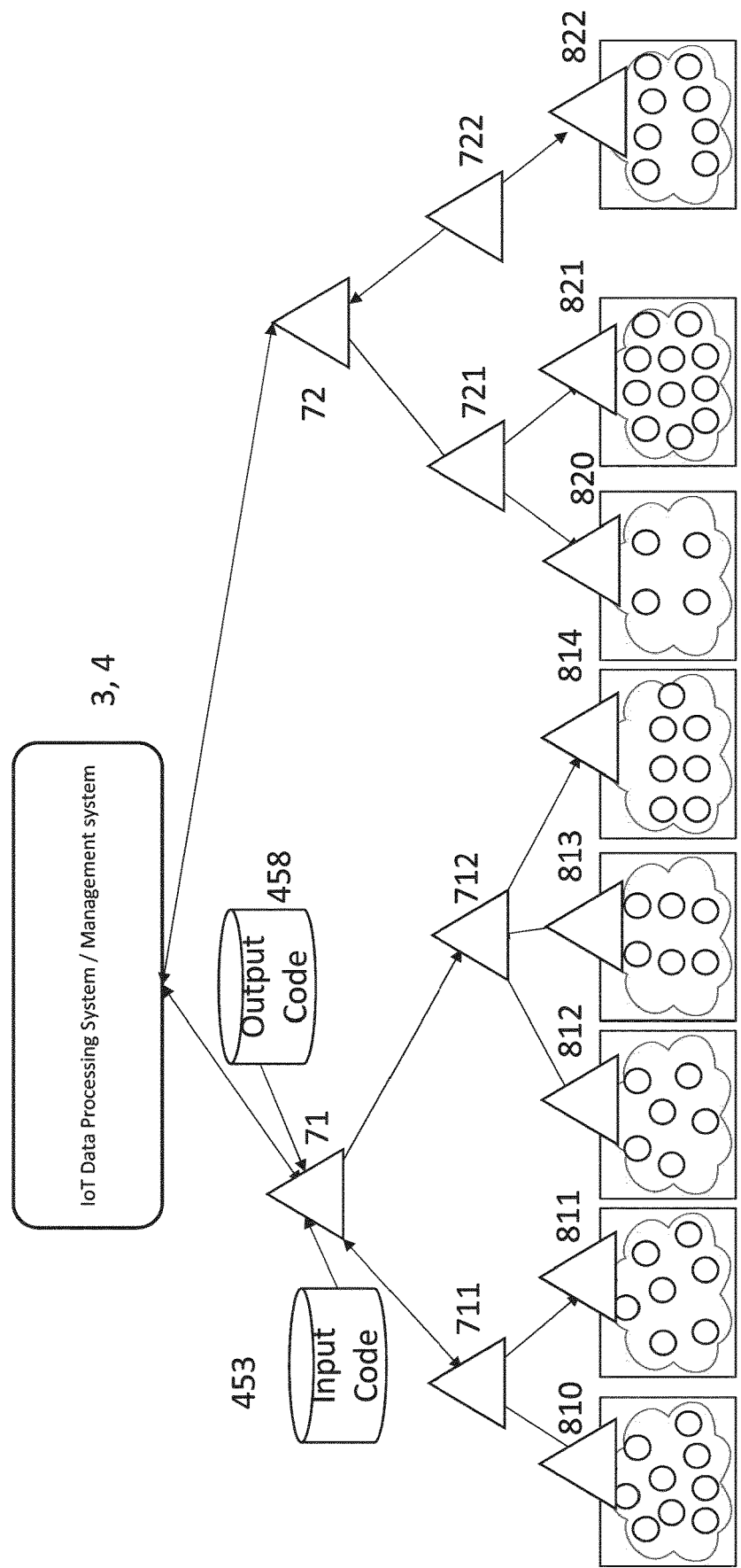
FIG. 12 is a schematic depiction of a hierarchical network operable according to an embodiment of the disclosure.

A large IoT network is usually organized as a hierarchy or relays. An embodiment of the disclosure using such a hierarchy is depicted in FIGS. 12, 13, 14 and 15. FIG. 12 depicts a three level hierarchy with nodes 810, 811 812 ... at the lowest level, nodes 711, 712, 721 at an intermediate level and two nodes 71, 72 at the third level. As shown in FIG. 12, it can be convenient to have all equivalent devices at the same hierarchical level even if f there is only one sensor in some of the branches, as depicted for the branch 722, 822.

Different elements in the network may perform different tasks (data generation, data processing) or use different communication technology (e.g. frequency, modulation, protocol). The signal from some sensors may not be visible to a base station of the telecommunications system, and hence has to be relayed/aggregated by other network elements (e.g. gateways/aggregators) to reach the base station. Several intervening relay stations may be required to reach the TS.

Certain tasks may need to be divided into sub-tasks to be undertaken by different types of elements at the various levels of hierarchy within the IoT network. For example, image recognition may be undertaken by two types of elements: a number of cameras may be responsible for capturing images and transmitting them to one/more processing stations which will analyze the raw images and only send the result (e.g. detection of a person, etc.) to the TS.

The CDMA system may be used in a hierarchically organized IoT network by arranging that at each level of the hierarchy, the signal from each node (sensor/aggregator) is only visible to one aggregator node at the next level up. This means that there is only one route from each sensor to the final TS through the hierarchy. At the lowest level of the hierarchy, the sensor nodes encode their data using CDMA codes assigned to them and transmit them to higher level aggregator/processor nodes.

At each level of the hierarchy, an aggregator node (for example node 711) receives data from nodes 810, 811 visible to it. The received data is aggregated and then encoded again using the CDMA code allocated to the aggregator itself. This means that the same bit of information will be encoded multiple times by aggregators (811, 711, 71) at different levels as it moves towards the management system 4.

At each level of the hierarchy, the nodes that share a common visible parent (e.g. nodes 810, 811 share parent node 711) share a code set and each node is assigned a separate code from this code set.

These constraints allow each code set to be reused by groups of nodes which have different parent nodes. For example, one code set can be used by nodes 810 and 811 in subnet 711. The same code set can also be used by nodes 812, 813, and 814 having parent node 712, by nodes 820 and 821 having parent node 721, and by node 822 having parent node 722. This re-use also applies to the aggregators at other levels of the hierarchy, so that nodes 711 and 712 (having parent node 71) can use the same codes as nodes 721, 722 (having parent node 72). Moreover, it is possible to use the same codes at each level of the hierarchy, provided that each node is reached by a different combination of codes.

FIGS. 12, 13, 14 and 15 illustrate a hierarchical network in which data transmitted by a subset of sensors through a gateway 810 (AU) is aggregated with data from one or more further gateways 811, 812, etc., at an aggregator unit 71 before dispatching it to the final destination. As depicted in FIG. 12, this aggregation can be repeated at a number of levels by further aggregator units e.g., 71, 72. At each level, the data generated by the aggregators at the previous level are re-aggregated. This approach reduces the total volume of data transmitted by the system as a whole, resulting in faster communication between the sensors and the final system. Since the transmitted data is re-encoded by each aggregator, the overall level of security is enhanced.

Figure 13:
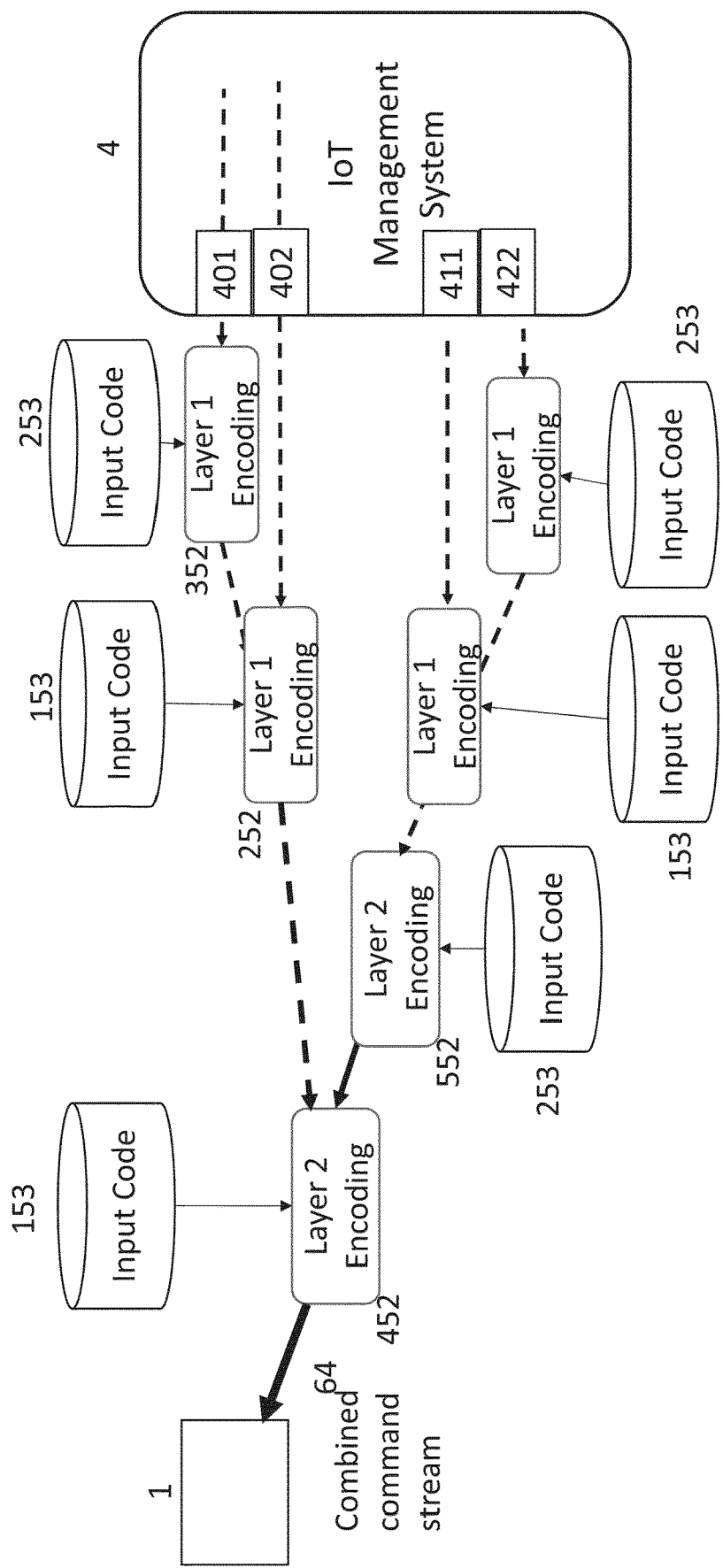
FIG. 13 is a schematic depiction of a second management system operable according to an embodiment of the disclosure.

As shown in FIG. 13, at the management system 4, the data from each interface 401,402, 411, 412 etc., is encoded one level at a time. Each stream is first encoded according to the layer 1 input code 153, 253 appropriate to the target node 810, 811 etc., (FIG. 12), the resulting streams can then be combined in turn at a second layer aggregator 452 using an input code 153 associated with the first aggregator 711 on the route (that is, the one closest to the target node). It will be noted that the same codes 153, 253 can be used at each level, and on different branches at the same level. This reduces the number of codes required at each level, allowing a more robust coding with less chance of mis-correlation, and therefore greater reliability.

Figure 14:
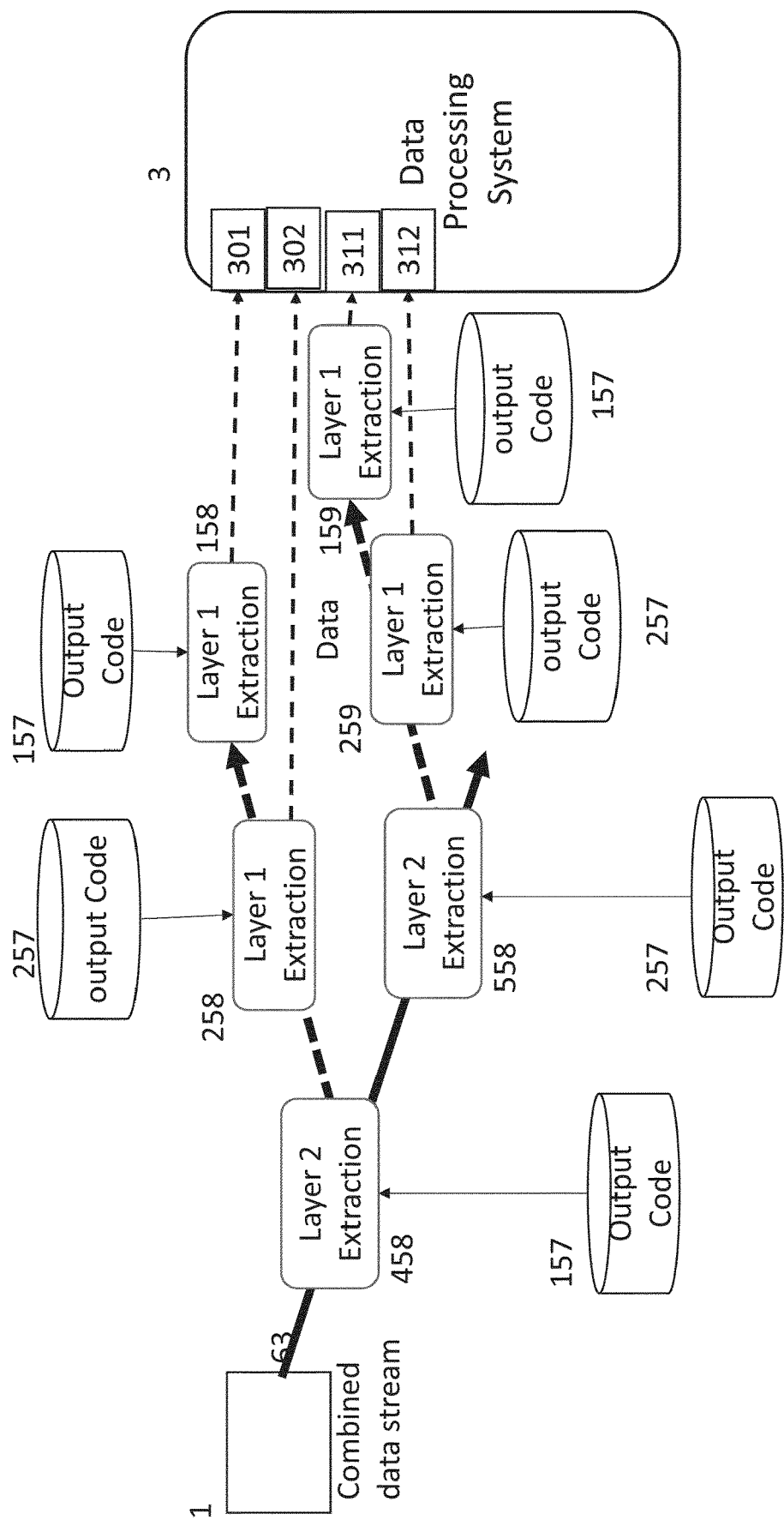
FIG. 14 is a schematic depiction of a second processing system operable according to an embodiment of the disclosure.

As shown in FIG. 14, extraction can also take place in stages, with layer 2 output codes 157, 257 used for extraction of the lower level data streams (extraction units 458, 558), and layer 1 output codes 157, 257 then being used to extract data at the lower level (extraction units 159, 259) to provide the data to the respective interface units 301, 302, 311, 312.

It will be seen from FIGS. 13 and 14 that the same codes 153, 253, 157, 257 can be re-used in each branch of the hierarchy, the individual sensors and actuators being differentiated by the branch in which they are arranged and thus the higher level input and extraction codes 153,253; 157, 257. Interference between levels is avoided because at each level the several signals to/from lower levels are convolved together and can only be correctly decoded by the receivers at the appropriate level.

Figure 15:
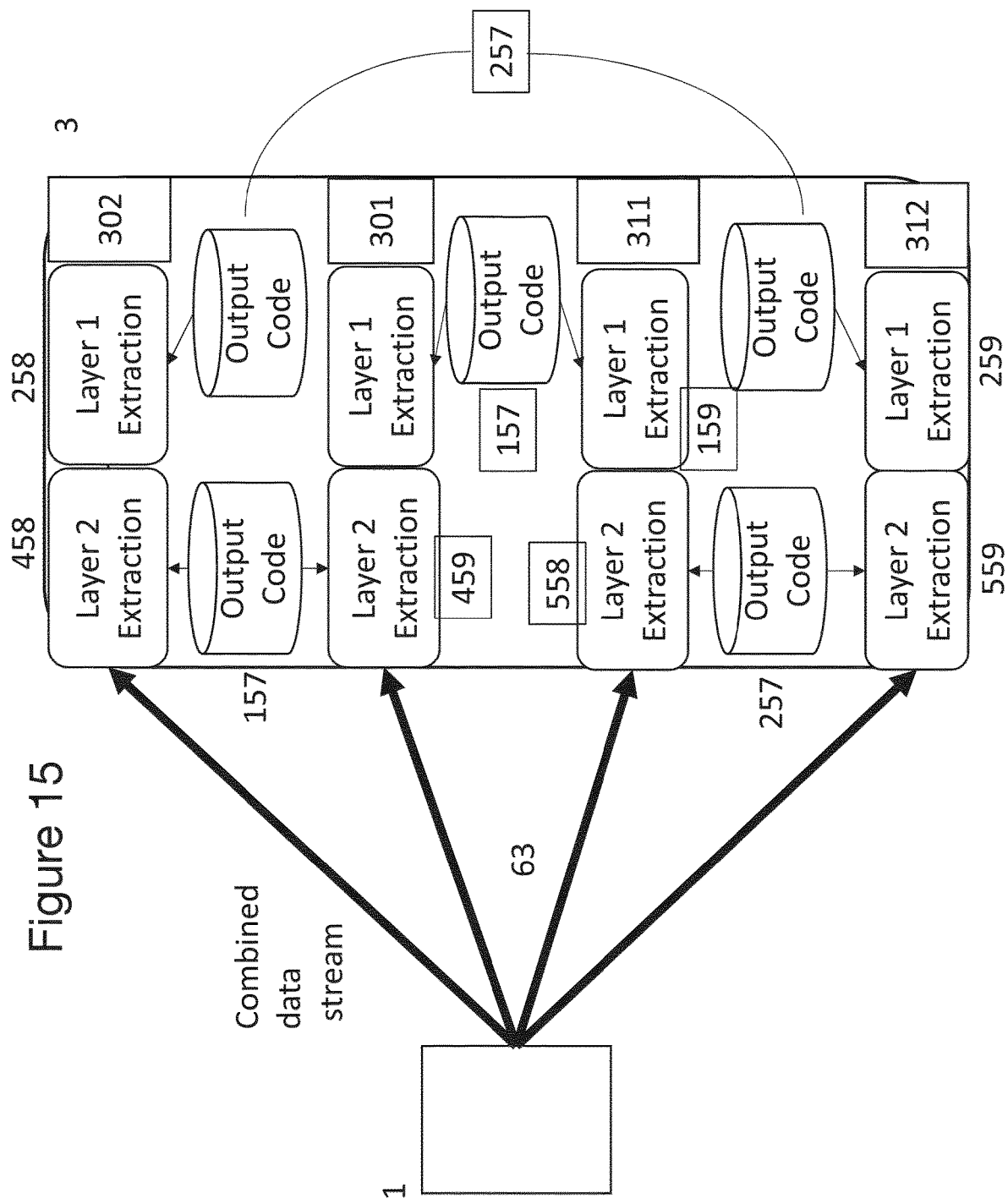
FIG. 15 is a schematic depiction of a third processing system operable according to an embodiment of the disclosure.

In an alternative arrangement shown in FIG. 15, each interface unit 301, 302, 311, 312 in the Data processing system 3 can receive the complete combined data stream 63 and have a dedicated set of extraction processors. For example, the interface unit 302 uses a layer 2 extraction unit 458 and a layer 1 extraction unit 258, using codes 157 and 257 respectively, whilst the interface unit 312 uses a layer 2 extraction unit 559 and a layer 1 extraction unit 259, using code 257 respectively. Note that although each code 157, 257 is used by more than one interface, each interface 301, 302, 311, 312 uses a unique combination of codes. Note also that because each layer converts each bit to or from a signal of multiple bits, the use of a first code in a first layer and a second code in a second layer cannot be read by a device in which decoding uses the second code in the first layer and the first code in the second layer.

Such a hierarchical system may be used to control a set of sensors and actuators individually or in various subsets of the whole. The sensors in a geographical area (such as one/more streets/cities/regions, etc.) can be controlled by a single management/control system (TS). This system may require to undertake actions such as switching on/off all or a subset of the sensors, download new version of software to all or a subset of them, etc. Ideally, the management/control system should be able to simultaneously send the data/instructions to the target sensors.

Figure 16:
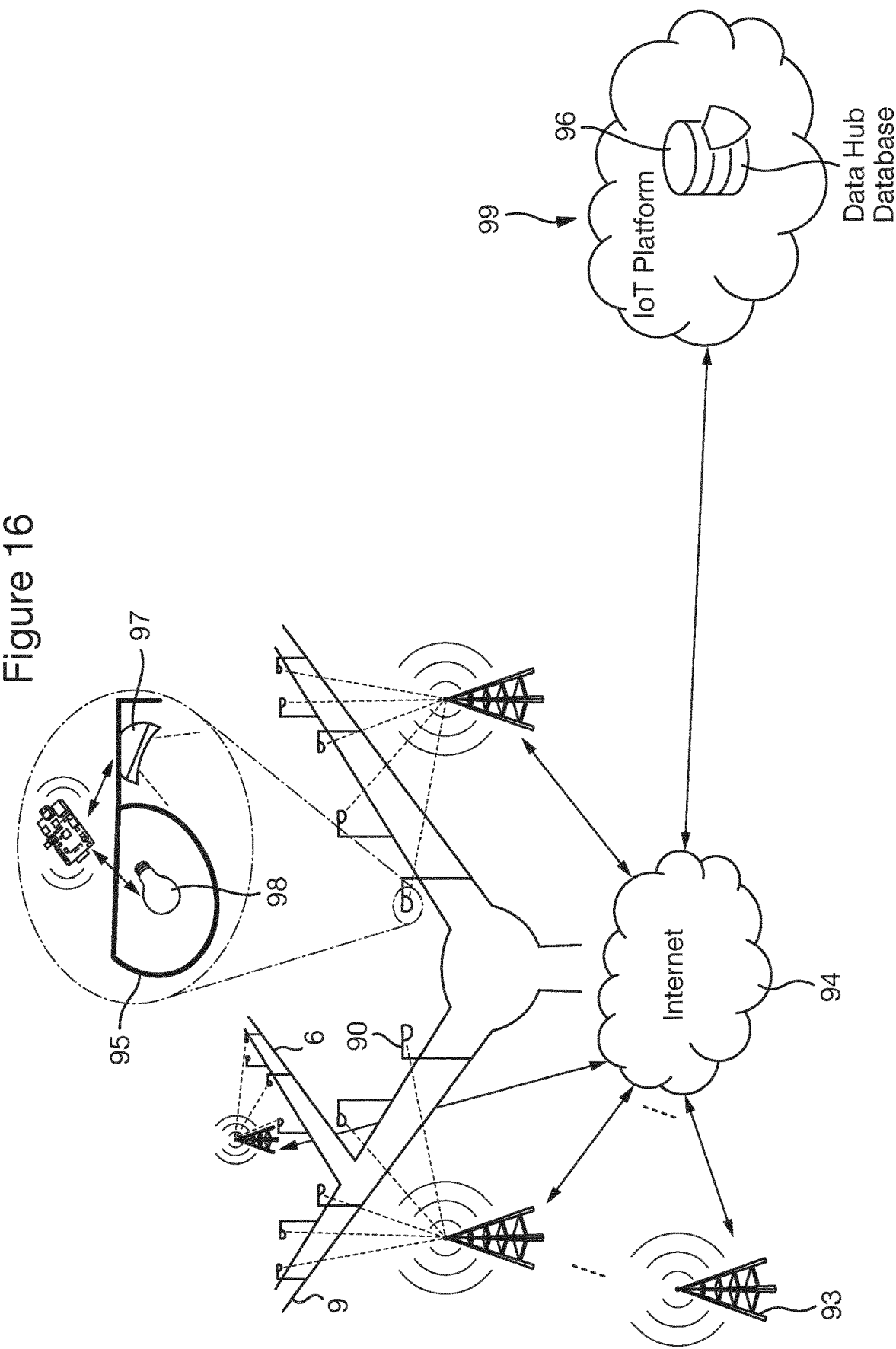
FIG. 16 is a schematic representation of a practical application of the hierarchical system of FIGS. 12, 13, 14 and 15.

For example, FIG. 16 depicts a system set up to control street lighting in a highway network 9. Each individual street lamp installation 90, 95 . . . has a wireless transducer with which it can communicate, by way of a wireless network 93 and the internet 94, with an application platform 99.

Each installation has a lamp 98 or other element such as a variable sign, and associated actuation apparatus to switch it on and off, and also has a sensor installation 97. The sensor installation 97 may include an ambient light sensor, which may be used to control the street lamp 98 directly. The sensor installation may also include sensors for other conditions not directly related to street illumination, such as temperature, traffic levels, pollution, etc.

The management/control system can achieve this by first encoding (using CDMA scheme) the individual messages destined for a set of sensors, located in a specific geographical area, using those sensors' individual keys. Next, the encoded messages are divided into a number of groups and the messages in each group are aggregated into one message. The resulting aggregated message is then broadcast. Subsequently, each sensor receiving the aggregated message can use its own key to extract any data/instruction that has been sent to it.

This approach allows the total number of messages sent by the management/control system to be reduced thorough aggregation. An aggregated message can include the messages destined for multiple sensors. This means the transmission of data/instructions to the target sensors can be achieved faster using less bandwidth. By sending a single message to multiple sensors it is possible to achieve the desired effect (e.g. switch them on/off) simultaneously. The sensors can also be targeted selectively—for example it is possible to change the status of only a subset of sensors in a geographical area.

If there is no hierarchy, i.e. all lamps are in the same level, assuming we have 49 lamps, one message of length 49 bits would be broadcasted to all lamps. However, with a hierarchical architecture, one message of length 49 bits can be sent to, for example, seven street level aggregators (i.e. level 1 of hierarchy). The aggregator then decodes the street level data and sends a message of length 7 bits to each of the individual lamps in each street. In this case, the length of the message sent to lamp nodes is much shorter than the no-hierarchy case. This saves battery and processing power. Also, in the hierarchical case code-reuse would be possible and shorter, simpler code families can be used.

Thus, all the N messages to N nodes can be combined into one message with the same length of a single message to each node, and broadcast. These mixed messages are recoverable, based on the orthogonality of the codes used to encoding the messages.

As an example of the use of the hierarchical systems of FIGS. 11 to 16, the installations 90, 95, etc., may be grouped so that all the installations in one street have the same level 2 code but different level 1 codes. This simplifies the control of a system as it allows each light to be controlled individually or, by selecting all level 1 codes but only one level 2 code, to make all the lights in one street to be turned on and in another to be turned off using the same message. Alternatively, if required, by selecting all level 2 codes but only one level one code, each street can be lit by a single light, thereby reducing energy consumption and light pollution, for example at times when there are few pedestrians present. By code sharing in this way, less bandwidth is required to transmit the data necessary than would be the case if each installation had to be sent a unique message.

In a network, with for example one base station serving seven streets, and each street having one aggregator serving seven lights, there are a total of seven aggregators and 49 lights, the required 49 messages, each with length of let us say L=49 bits, can be merged together in a single message of length L=49. This message is broadcast to all seven aggregators (level 1 in hierarchy), where the messages are decoded using seven different and unique codes within the aggregators. This decoded message is passed to each and all lights in each and all streets (level 2 in hierarchy). In a similar approach, again, lights decode these level 1-decoded-messages with their own codes and recover the data. In this example, seven codes are required for 49 lights. The same seven codes can be used for the seven aggregators. So, 7 aggregators, and all 7 lights in each street use c1-c7. It means that light 1 in all the streets, and aggregator 1 (street 1) use the same code c1, but as it is shared across different branches of the hierarchy levels, they would not interfere.

It has been mentioned that the code sequences can be reused at each level (FIG. 5), to transmit the data to and from the data hub. Hence, theoretically each code can be re-used both "horizontally" within a given level (on different branches) and "vertically" (at different levels) in the proposed hierarchy design. For example, code $c_1$ can be re-used for the sensors on the first lamp posts on each street 1, 2, . . . , 6, 7 (i.e. horizontal reuse at level 1) and also for aggregators in levels 2, 3 and above (i.e. vertical reuse).

Figure 17:
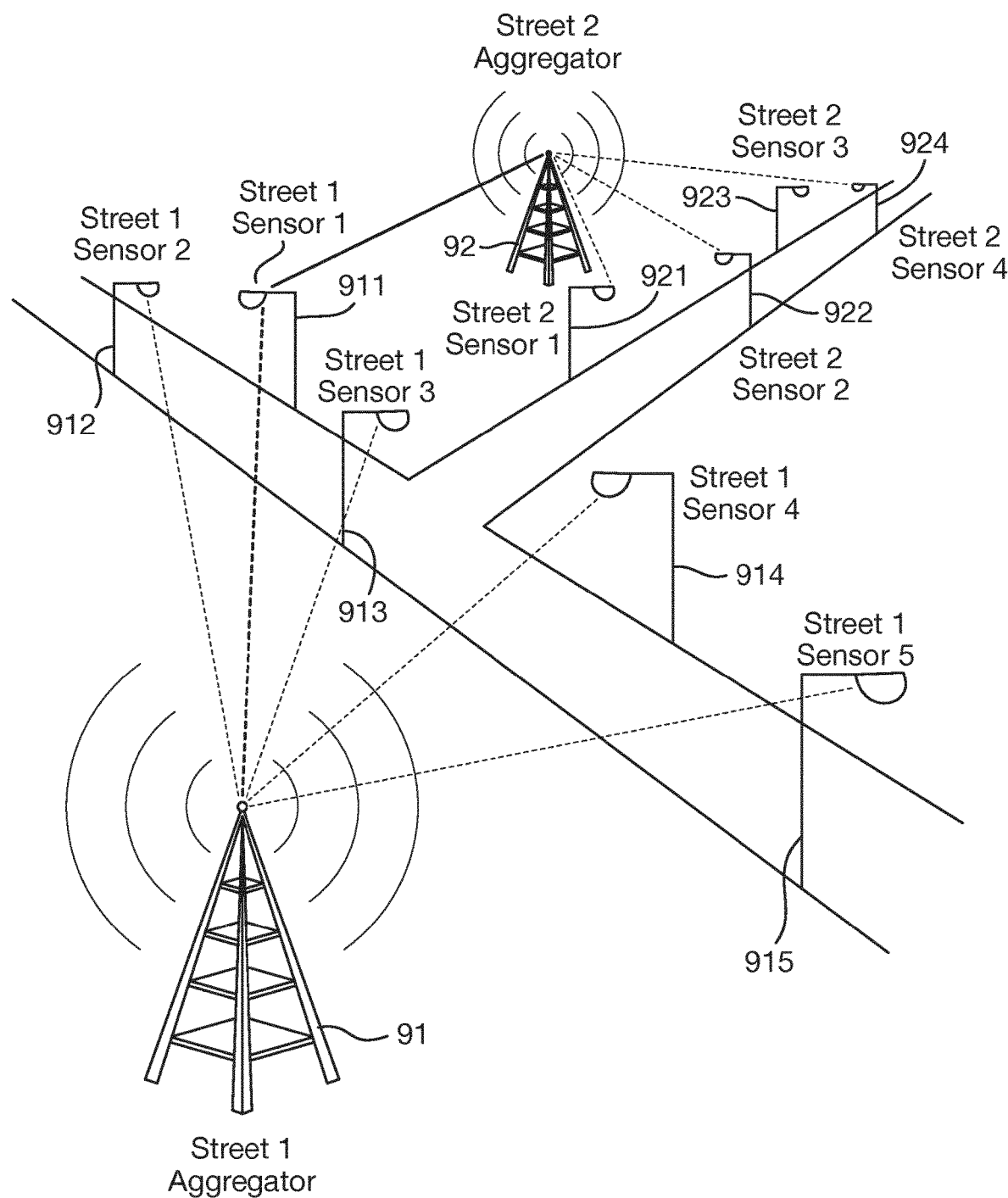
FIG. 17 is a schematic representation of an example collision in a hierarchical system, according to an embodiment of the disclosure.

In practice this may not be 100% achievable, particularly when communication is by wireless transmission rather than a closed system such as wire or fiber, because of the locations of sensors (Level 1) and aggregators (Level 2). FIG. 17 illustrates an example of a collision in such a configuration. In FIG. 17, a first aggregator 91 is depicted serving a set of actuators (street lights) 911, 912, . . . 915, and a second aggregator 92 serves a second set of actuators (street lights) 921, 922, 923, 924.

As described above, it is possible for both sets of actuators to use the same set of codes at the second level, as they are associated with different aggregators. In this example both device 911 and 921 are allocated the same code $c_1$, and report to their respective street's aggregators 91, 92. However, if a device 911 working to the first aggregator 91 is also in the range of the second aggregator 92, it will interfere with a device 921 working to that second aggregator 92 using the same second level CDMA spreading code. Furthermore, in the case of "vertical" reuse (re-use of codes at different levels in the hierarchy) there may also be interference between levels. This can be resolved by allocating different sets of codes to neighboring aggregators.

Let us say we have a prime code set of C=$\{c_1, c_2, c_3, \ldots, c_{49}\}$, where prime number p=7 and the cardinality (i.e. the number of codes) is $p^2$.

For given code set, let us define seven code groups, each having seven members, as follows:

A=$\{c_1, c_2, \ldots, c_7\}$
B=$\{c_8, c_9, \ldots, c_{14}\}$
C=$\{c_{15}, c_{16}, \ldots, c_{21}\}$
D=$\{c_{22}, c_{23}, \ldots, c_{28}\}$
E=$\{c_{29}, c_{30}, \ldots, c_{35}\}$
F=$\{c_{36}, c_{37}, \ldots, c_{42}\}$
G=$\{c_{42}, c_{43}, \ldots, c_{49}\}$ The number of members in each code group in this example is equal to the number of groups, but this is not necessarily the case. For example if p=11 there are $p^2$=121 available codes, allowing 17 for each of the seven groups (7×17=119), with two spare codes for management or broadcast purposes.

Figure 18:
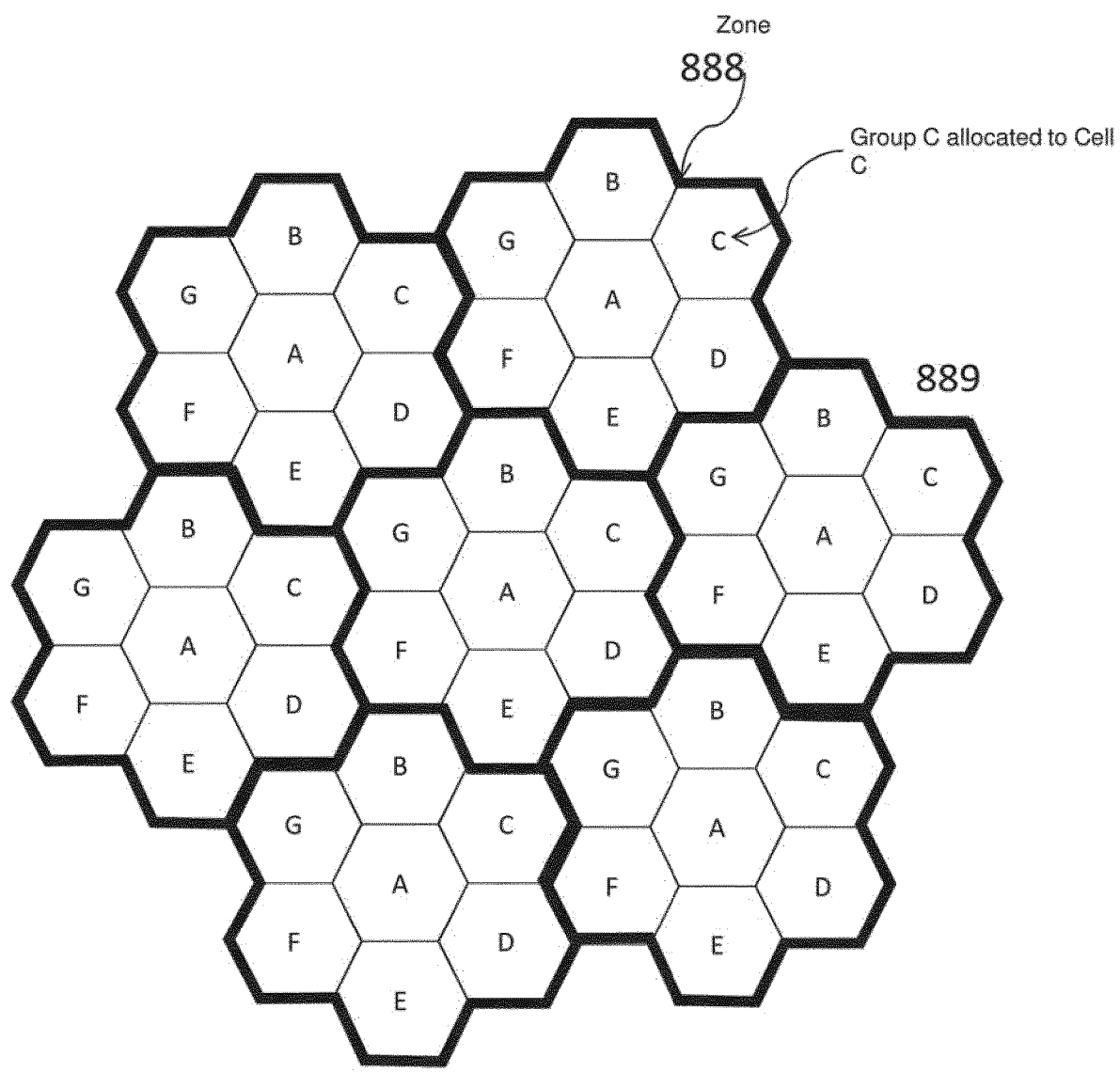
FIG. 18 is a block diagram of code group distribution, according to an embodiment of the disclosure.

FIG. 18 below shows how these groups of codes may be distributed in such a way that their codes do not interfere with each other. The geographical area would be divided into various zones depicted in bold outline, such as Zones 888, 889, and each zone consists of seven cells, respectively labeled A, B, C . . . G. Each group of codes (i.e. A-G) is then allocated to the cells in the respective zone. Each sensor or aggregator operating in a cell, will then use a code selected from a code group allocated to that cell.

The radius of each hexagon in FIG. 18 is selected to be the approximate range of each transmitter, assumed if it has been located in the middle of hexagon, although in practice factors such as variations in topography and irregular location of transmitters make a practical embodiment depart from the regular hexagonal array depicted in FIG. 18. It should also be noted that transmitter ranges do not have clearly defined cut-offs, so boundaries are not as clearly defined in practice as would appear from FIG. 18, and a transmitter near a depicted boundary between two zones in FIG. 18 is likely to be detectable in parts of the adjacent zone.

In order to avoid potential conflicts caused by such overlap, each cell and corresponding group of codes are re-used in other zones as shown, thus providing that the same cells/groups are not reused in adjacent neighboring cells, as that would cause co-channel interference. In this model, between any two or more identical cells/groups (let us say cells within Group A) there are at least two other adjacent groups, and this provides a code-interference-free environment; so that all the used codes can be reused in other zones.

The maximum number of devices that can be accommodated in each cell is then N (in this example eleven) and in each zone 7N devices can be accommodated.

The same structure can be replicated at higher levels in the hierarchy, such that, for example, the aggregators serving the cells in Zone 888 all report to a higher-level aggregator using code A, and those in Zone 889 use Code B.

One class of orthogonal codes for use in CDMA are known as the "prime codes". Embodiments of this disclosure use a prime code family referred to as "Uniform Cross-Correlation Modified Prime Code", UC-MPC which provides both higher code weight and auto-correlation (AC) while its cross-correlation (CC) value remains 1 for all code sets derived from it. Because of the uniformity of the CC function of UC-MPC, the probability of interference is the same between each pair of code signatures whereas in the other prime code families this is not the case.

The unique properties of UC-MPC result in:
(i) better system performance through lower bit error rate (BER)
(ii) higher difference between auto-correlation and cross-correlation of codes
(iii) improved code security
(iv) reduced co-channel interference
(v) easier to decode in the receiver
(vi) for a specific code length p, the maximum number of simultaneous users (N) in a system employing UC-MPC signatures is higher than systems employing other prime code families UC-MPC can be easily implemented in an existing conventional prime code system without any need to change the hardware.

The advantages of using CDMA in IoT sensor networks include faster and more secure communication. In particular, the messages dispatched from a large number of sensors can be combined into a single message, either over the air, or at a gateway, for onward transmission. This reduces the total number and size of all the messages transmitted by the sensors, hence resulting in speedier communication.

The invention claimed is:

1. A method for generating signals specific to a plurality of devices, for transmission by a control center to each of the plurality of devices, the method comprising:
   formulating each signal to include a spread spectrum coding sequence specific to a respective device of the plurality of devices convolved with a code specific to a command to be performed by an actuator associated with the respective device of the plurality of devices, for transmission over a multiple access channel carrying a plurality of the signals, each specific to a respective device, wherein commands relating to each device can be extracted by convolving the signal with the spread spectrum encoding sequence specific to the respective device;
   allocating a further broadcast spread spectrum coding sequence to a broadcast channel readable by the plurality of the devices and used to transmit general commands for operation by the plurality of devices;
   responding, by the plurality of devices, to the general commands by changing spread spectrum encoding sequences allocated to the plurality of devices for transmission and receiving data; and
   responding, by one or more devices of a first group, to a set of general commands by switching between:
     a first receive only mode, using a first spread spectrum sequence,
     a second transmit only mode using the same or a second spread spectrum sequence,
     a full duplex mode using two spread spectrum sequences to transmit and receive simultaneously, and
     an idle mode in which the devices of the first group are responsive only to the broadcast spread spectrum encoding sequence, wherein the same set of general commands causes a second group of devices to respond in a manner complementary to the responses of the first group, so that a set of spread spectrum sequences is allocated to the first group and the second group in common, each spread spectrum sequence being used at any given time by only one or other of the first group or the second group.

2. The method according to claim 1, wherein the general commands include synchronization signals.

* * * * *